(12) United States Patent
Klassen

(10) Patent No.: US 10,174,818 B2
(45) Date of Patent: Jan. 8, 2019

(54) ROLLER DRIVE

(71) Applicant: Genesis Advanced Technology Inc., Langley (CA)

(72) Inventor: James Brent Klassen, Langley (CA)

(73) Assignee: Genesis Advanced Technology Inc., Langley (CA)

( * ) Notice: Subject to any disclaimer, the term of this patent is extended or adjusted under 35 U.S.C. 154(b) by 77 days.

(21) Appl. No.: 15/115,897

(22) PCT Filed: Jan. 30, 2015

(86) PCT No.: PCT/CA2015/050072
§ 371 (c)(1),
(2) Date: Aug. 1, 2016

(87) PCT Pub. No.: WO2015/113163
PCT Pub. Date: Aug. 6, 2015

(65) Prior Publication Data
US 2017/0204947 A1 Jul. 20, 2017

Related U.S. Application Data

(60) Provisional application No. 61/933,522, filed on Jan. 30, 2014.

(51) Int. Cl.
*F16H 1/28* (2006.01)
*F16H 13/08* (2006.01)
*F16H 57/025* (2012.01)

(52) U.S. Cl.
CPC ............... *F16H 13/08* (2013.01); *F16H 1/28* (2013.01); *F16H 57/025* (2013.01)

(58) Field of Classification Search
CPC .................................. F16H 13/08; F16H 1/28
See application file for complete search history.

(56) References Cited

U.S. PATENT DOCUMENTS

| | | |
|---|---|---|
| 1,737,695 A | 12/1929 | Zadow |
| 3,330,171 A | 7/1967 | Nasvytis |

(Continued)

FOREIGN PATENT DOCUMENTS

| | | | |
|---|---|---|---|
| CA | 2047894 A1 | 1/1992 | |
| DE | 102014110545 A1 * | 1/2016 | ........... F16H 49/001 |

(Continued)

OTHER PUBLICATIONS

International Search Report for Application No. PCT/CA2015/050072 dated May 7, 2015, 2 pages.

(Continued)

*Primary Examiner* — Justin Holmes
*Assistant Examiner* — Lillian T Nguyen
(74) *Attorney, Agent, or Firm* — Seed Intellectual Property Law Group LLP

(57) ABSTRACT

A high speed ratio drive system is formed of planet rollers, each having varying diameter, an outer fixed ring in contact with one diameter of the planet rollers, and an outer drive ring in contact with another diameter of the planet rollers. An inner drive element is provided by a sun drive roller in contact with the planet rollers or by a planet carrier. Preferably the system has an axial reflective symmetry minimizing twisting forces on the planet rollers.

70 Claims, 30 Drawing Sheets

(56) References Cited

U.S. PATENT DOCUMENTS

| | | | |
|---|---|---|---|
| 3,380,312 A | 4/1968 | Barske | |
| 4,132,131 A | 1/1979 | DeBruyne | |
| 4,471,667 A * | 9/1984 | Kraus | F16H 13/08 476/61 |
| 4,541,305 A * | 9/1985 | Hamabe | F16H 13/08 475/184 |
| 4,561,326 A | 12/1985 | Hamabe et al. | |
| 4,918,344 A | 4/1990 | Chikamori et al. | |
| 5,711,736 A | 1/1998 | Kyodo | |
| 6,893,371 B2 | 5/2005 | Mills et al. | |
| 7,052,428 B2 | 5/2006 | Bolz | |
| 7,201,700 B2 | 4/2007 | Buxton | |
| 8,758,178 B2 | 6/2014 | Gunji et al. | |
| 8,951,162 B1 | 2/2015 | Mourani | |
| 9,249,861 B2 | 2/2016 | Fedosovsky et al. | |
| 9,567,069 B2 | 2/2017 | Cox | |
| 9,725,161 B2 | 8/2017 | Cox | |
| 9,725,163 B2 | 8/2017 | Edelson et al. | |
| 2002/0091030 A1 * | 7/2002 | Haga | F16H 1/2836 475/163 |
| 2016/0025152 A1 | 1/2016 | Klassen et al. | |
| 2016/0122008 A1 | 5/2016 | Cox et al. | |
| 2017/0184185 A1 | 6/2017 | Schorsch | |

FOREIGN PATENT DOCUMENTS

| | | | | |
|---|---|---|---|---|
| GB | 1 465 838 | | 3/1977 | |
| JP | 2011-102623 A | | 5/2011 | |
| SU | 1294606 A1 | | 3/1987 | |
| WO | 81/00899 A1 | | 4/1981 | |
| WO | 2008/116646 A1 | | 10/2008 | |
| WO | 2013/173928 A1 | | 11/2013 | |
| WO | WO-2013173928 A1 * | 11/2013 | | F16H 13/08 |
| WO | 2014/105894 A2 | | 7/2014 | |

OTHER PUBLICATIONS

Timken "Setting Techniques for Tapered Roller Bearings" Order No. 5556, 2015, 20 pages.

Levai, Z., "Structure and Analysis of Planetary Gear Trains" Jnl. Mechanisms vol. 3, pp. 131-148; Pergamon Press, 1968.

Chapter II of "Simple Planetary Gear Trains for High Transmission Ratios", Henriot; 2001, pp. 149-151.

Kapelevich, A., "High Gear Ratio Epicyclic Drives Analysis", Gear Technology, Jun. 2014, pp. 62-67.

Marsch, J., "Design and Use of Epicyclic Gear Systems", National Manufacturing Week, Seesion #4D32, Mar. 10, 2005, 38 pages.

Amendment in response to Mar. 14, 2018 Office Action in U.S. Appl. No. 15/461,170, 6 pgs.

Notice of Allowance for U.S. Appl. No. 15/461,170 dated Jul. 25, 2018, 7 pgs.

* cited by examiner

ROLLER DRIVE

CROSS-REFERENCE TO RELATED APPLICATIONS

This application claims the benefit under 35 USC 119(e) of U.S. provisional application Ser. no. 61/933,522 filed Jan. 30, 2014.

TECHNICAL FIELD

Large speed ratio power transmission.

BACKGROUND

The present device is in the technical field of power transmission. More particularly the present device lies in the technical field of friction drive power transmission. More specifically, the present invention is in the field of large speed ratio differential friction drive power transmission. The present invention relates to, but is not limited to the field of robotic actuators.

SUMMARY

In an embodiment, there is disclosed a drive system comprising rollers, each roller having a first portion of a first diameter and a second portion of a second diameter, a fixed outer ring arranged in rolling contact with the respective first portion of each roller, and an outer drive or driven ring arranged in rolling contact with the respective second portion of each roller.

The rollers may be planet rollers and may be arranged about a sun roller. In further embodiments, there may be included one or more of the following: the drive system may be arranged as a speed reducer in which the sun drive roller provides an input and the outer driven ring provides an output; the drive system may be arranged as a speed increaser in which the sun drive roller provides an output and the outer drive ring provides an input; there may be a floating sun roller arranged in rolling contact with the respective second portion of each roller, the sun drive roller being arranged in rolling contact with the respective first portion of each roller; and there may be a floating sun roller arranged in rolling contact with the respective first portion of each roller, the sun drive roller being arranged in rolling contact with the respective second portion of each roller.

In another embodiment, the drive system may have a planet carrier drive element arranged to rotate with the planet rollers around an axis defined by the outer drive or driven ring. In further embodiments, the drive system may be arranged as a speed reducer in which the planet carrier drive element provides an input and the outer driven ring provides an output; the drive system may be arranged as a speed increaser in which the planet carrier drive element provides an output and the outer drive ring provides an input; and there may be a first floating sun roller arranged in rolling contact with the respective first portion of each planet roller and a second floating sun roller arranged in rolling contact with the respective second portion of each planet roller.

In various embodiments there may be included one or more of the following: the first diameter may be greater than the second diameter, the first diameter may be less than the second diameter, there may be a second fixed outer ring, the fixed outer ring and second fixed outer ring being arranged symmetrically one on each side of the outer drive or driven ring; there may be a second outer drive or driven ring, the outer drive or driven ring and the second outer drive or driven ring being arranged symmetrically one on each side of the fixed outer ring, and being connected to each other to rotate together; there may be gear teeth on one or more pairs of surfaces in rolling contact; the rollers may be tapered, with respective tapered portions narrowing inwardly or outwardly; surfaces contacting the respective tapered portions may be correspondingly tapered, surfaces contacting the respective tapered portions may be tapered in ratios corresponding to the ratios of the diameters the respective elements at the contacting surfaces; the planet rollers may have a reflective symmetry with respect to a plane, the rollers defining respective axes perpendicular to the plane; and the elements in rolling contact with the planet rollers may define axes perpendicular to the plane and collectively have a reflective symmetry with respect to the plane.

BRIEF DESCRIPTION OF THE FIGURES

Embodiments will now be described with reference to the figures, in which like reference characters denote like elements, by way of example, and in which.

DETAILED DESCRIPTION

In an embodiment there is disclosed an apparatus for transmitting power through circular motion while providing the option of a high rotational speed ratio as well as torque multiplication that is approximately proportional to the rotational speed ratio (save minus various losses such as rolling friction). A preferred embodiment uses 100% rolling contact traction force to transfer torque from the fixed member(s) to the output member(s) via the planet rollers and sun roller input. Advantages of certain embodiments include, but are not limited to light weight, small size, low noise creation, smooth operation, high stiffness, and relatively high torque for a friction torque transfer device. The device can also be constructed with a hollow sun roller (as shown in FIGS. 1 through 6) for cable access in applications such as robotic and bionic joints. Rolling contact also has the benefit of zero backlash and high resolution for precision positioning such as for medical and industrial robots. Rolling contact allows the contact members to slide in an over-torque scenario acting as a failsafe mechanism to reduce or eliminate damage.

Figure 1:
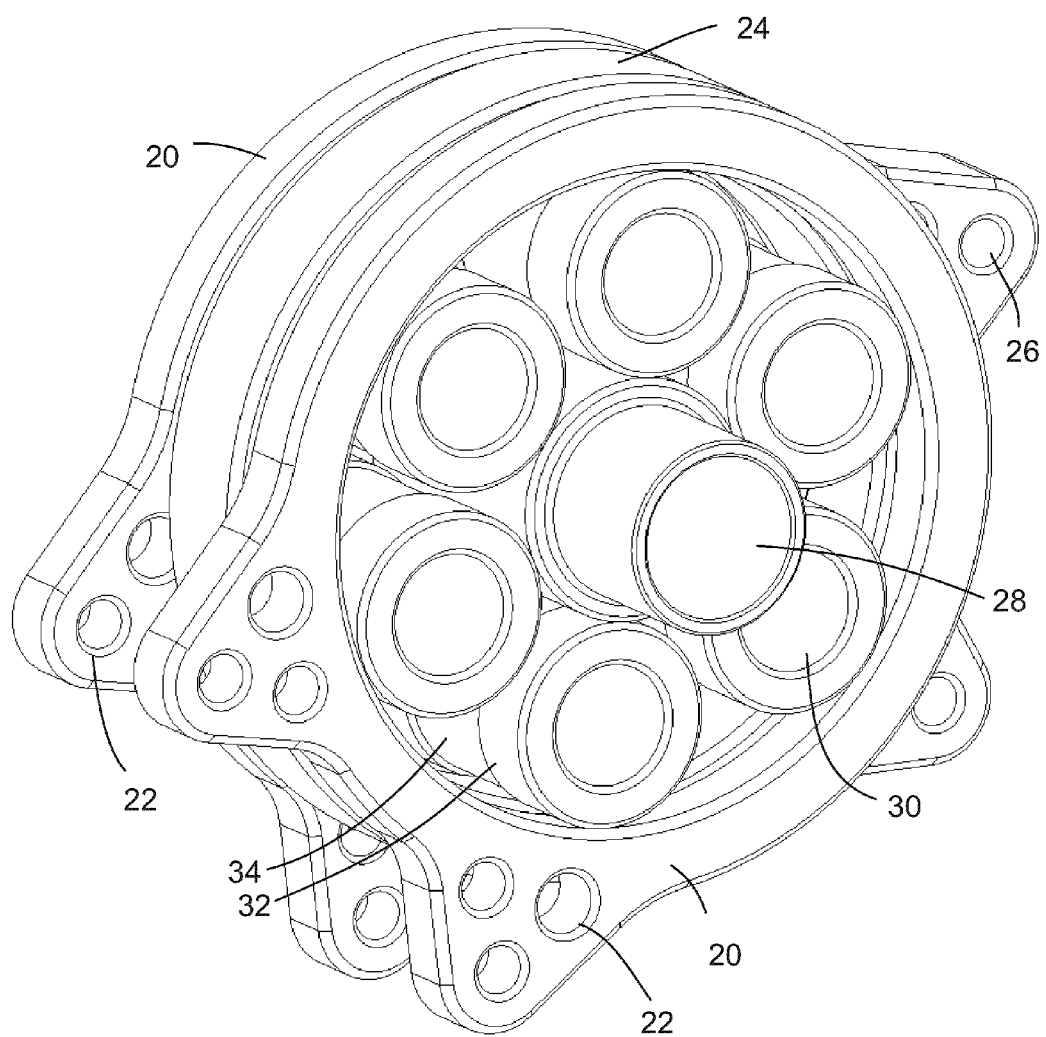
FIG. 1 is isometric view of a preferred embodiment of a high ratio rolling contact speed change device.
Figure 2:
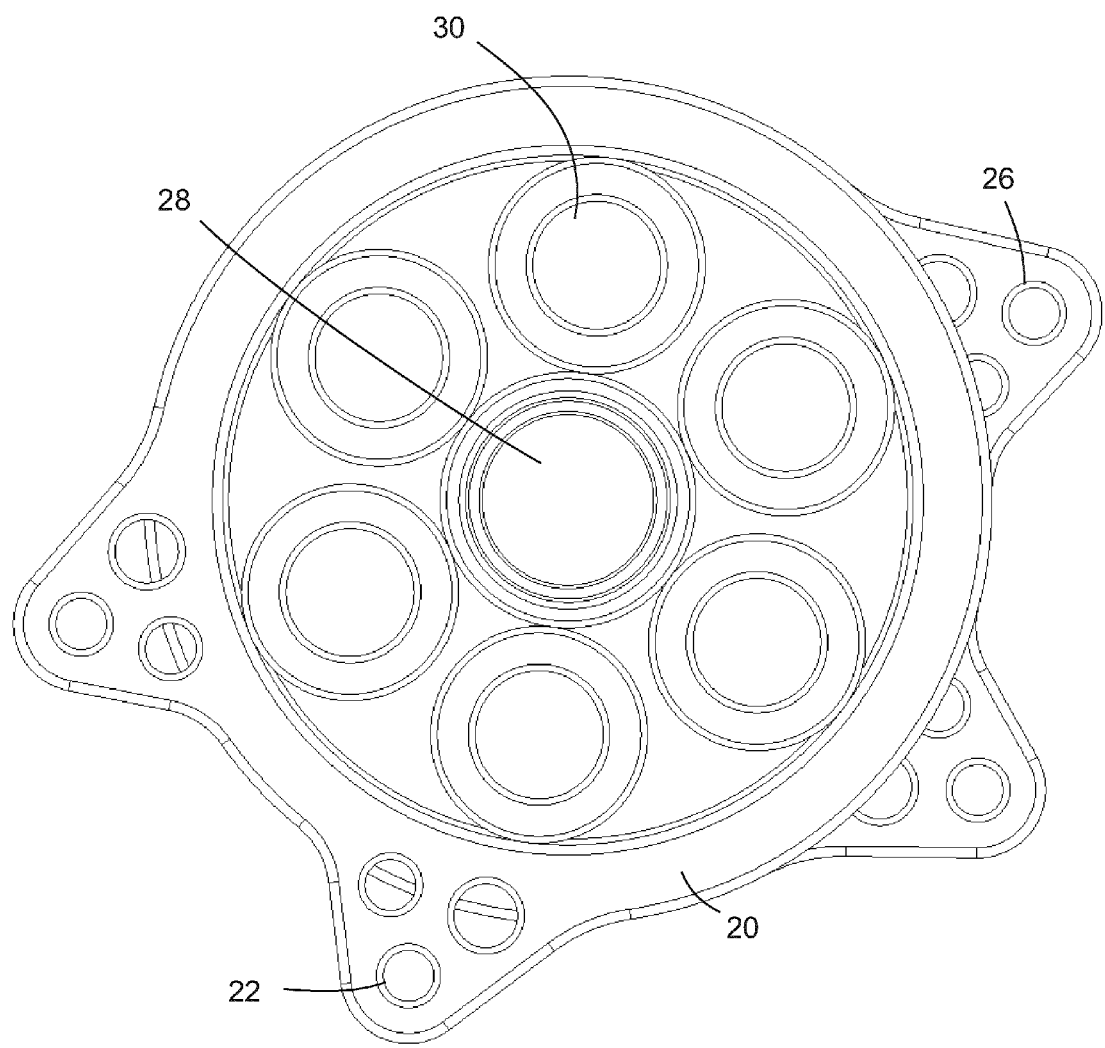
FIG. 2 is a side view of the device of FIG. 1.
Figure 3:
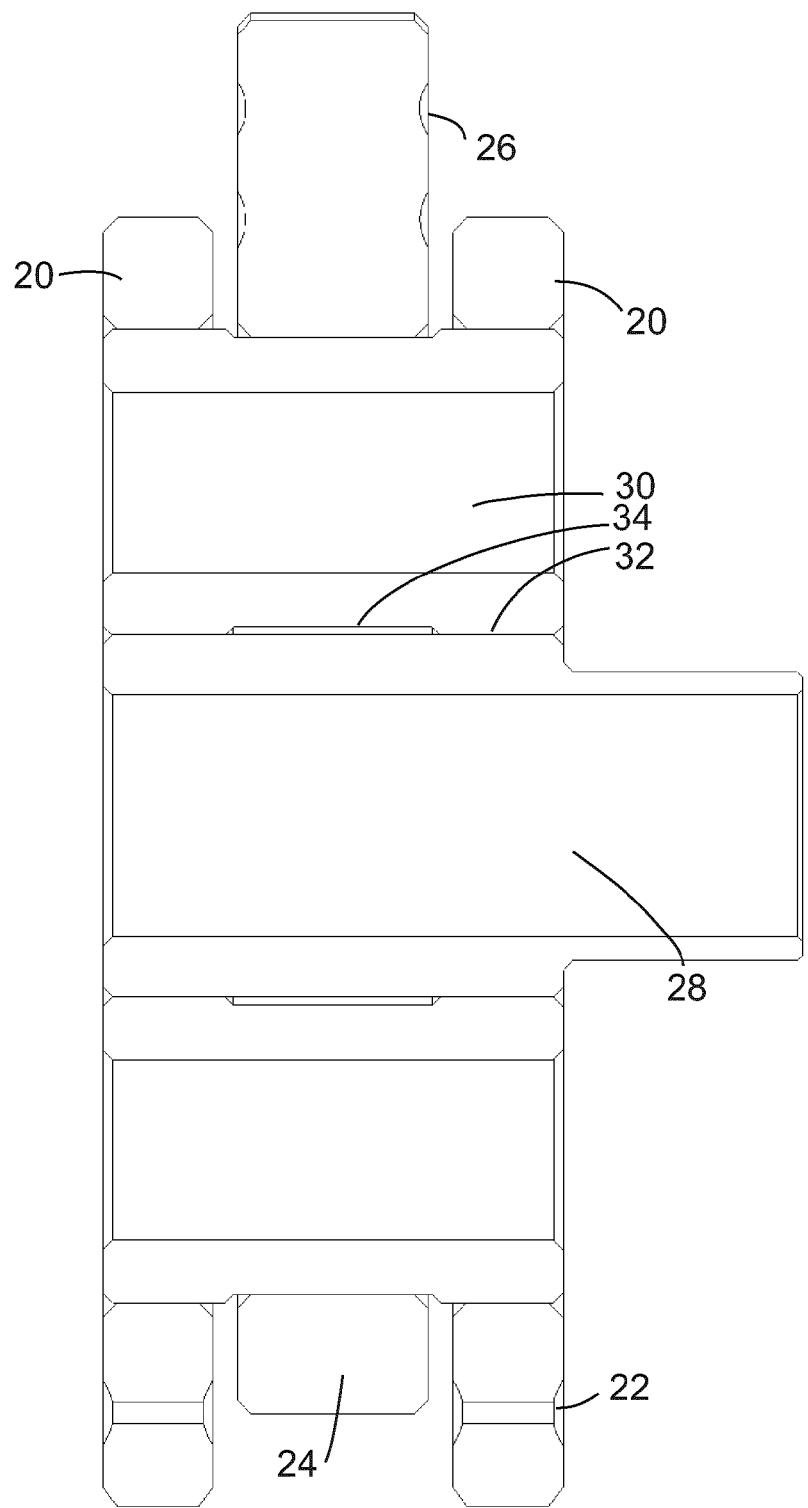
FIG. 3 is a section view of the device of FIG. 1.

Referring now to the device in more detail, in FIG. 1 to FIG. 3 there is shown the preferred embodiment of the present device. Two ring members 20 are fastened to a fixed member (not shown), rendering them fixed. In the embodiment shown, fixed ring members 20 have fixed ring attachment flanges 22 for connecting to the fixed member. The mechanism for fixing the rings is not shown; it may be moveable if the device is part of a larger assembly. Henceforth, the rings will be referred to as "fixed" for the purposes of this disclosure. Conversely, the two "fixed" members in this example may be used as the output members and the "output member" in this example may be fixed. Fixed ring members may be attached to each other or to another common member. The fixed rings may be rotationally fixed together with an integrated housing and/or an external structure, such as base 42 shown in FIG. 6, to maintain alignment of the symmetrical forces acting on the rollers.

Output ring 24 is fastened to an output member (not shown) to move the output member. In the embodiment shown in FIGS. 1-3, output ring 24 has output ring attachment flanges 26 for connecting to the output member. A sun roller 28 is positioned coaxially within the output and fixed rings. Planet rollers 30 are arranged around the sun roller and within the output and fixed rings, in rolling contact with the sun roller and the output and fixed rings. Planet rollers 30 have a first portion of a first diameter in rolling contact with the fixed output ring(s) and a second portion of a second diameter in rolling contact with the output ring(s). In the embodiment shown, the planet rollers 30 have a larger diameter at their ends 32 to contact the fixed rings 20, and a smaller diameter in the middle 34 to contact the output ring 24. In the embodiment shown, the sun roller contacts only the larger diameter of the planet rollers.

In further detail, still referring to the invention of FIG. 1 to FIG .3, the purpose of having two fixed rings is to reduce or eliminate twisting forces on the planet rollers. The symmetrical roller shape across the center plane with two fixed races, one at each end, results in balanced forces (equal tangential force on the rollers across the center plane) reducing twisting forces (around a radial line from the device axis through the center point of a roller axis) and reduces or eliminates the need for a carrier to ensure the rollers stay aligned. With a fixed contact patch on either end of each roller, and a single output contact patch in the middle of each roller, a bearing cage (which may or may not be used, and which is not shown in these examples) is only beneficial to guide the rollers and to keep the rollers from contacting each other. This bearing cage functions much like a bearing cage in a rolling element bearing. In other words, a bearing "cage" is not required to transfer load from the fixed ring(s) to the output ring(s) because the forces on the planet rollers are balanced in such a way that there is very little or no force causing the planet rollers to twist from their intended rotational axis. The bearing "cage" can be external to the rollers as with a conventional bearing cage, or it can be internal to the rollers more like a planet carrier in a conventional planetary gear reducer. The speed change ratio is accomplished primarily by the difference in the internal diameter of the fixed rings compared to the internal diameter of the output rings. The inner and outer contact surfaces of the planet rollers have the same diameter difference as the difference between the outer ring(s) contact surface diameters. The closer these diameters are to each other, the higher the final speed change ratio. The fixed ring(s) may be smaller or larger than the output ring(s). Gears would also provide the function of spacing the rollers.

The sun roller has the effect of providing a rolling contact preload for the planets against the rings. The sun roller also contributes to the speed change ratio. The smaller the sun roller is, the greater the reduction ratio is between the input and output. The sun roller may be driven by hand or by a motor or by other means. The sun roller may also be the output member if the device is used as a speed increaser.

The sun roller and/or the planet rollers and/or the ring member(s) preferably have elastic and other material properties that allow the system to be preloaded, to provide the required traction force. The example in FIG. 1 to FIG. 3 is made of steel. It has ring inner contact surface diameters of 2 inches and is designed to achieve a torque output torque of 20 foot pounds.

One embodiment of the present invention provides preload by the use of a split outer housing. The split housing ring has clamping tabs that can be actuated by a screw, a spring, or any other method. This split outer ring can be used in conjunction with in section compressible outer race to provide preload by reducing the ID of the thin section outer race and at the same time keep it circular in shape as a result of the shape of the split outer housing. The split outer ring provides ease of manufacture, means for self-adjustability, and means for adjustable preload.

The construction details of the invention as shown in FIG. 1 to FIG. 3 are the following. Many materials may also be used such as, but not limited to, steel rings with steel, ceramic, or carbide rollers. Specialized high friction ceramics such as alumina or toughened alumina may be used in certain applications in order to achieve different performance characteristics. Care must be taken to ensure that the thermal expansion properties of the materials are considered so that the preload provides adequate traction force throughout the entire range of operating temperatures. Steel rings with carbide planet rollers combined with a sun gear material which has a high enough thermal expansion coefficient to compensate for the lower expansion ratio of the carbide planet rollers is a good choice for higher load applications. Using the embodiment shown in FIGS. 4 and 5, with smaller diameter planet rollers (as shown) reduces the effect of the lower thermal expansion ratio of the rollers.

Traction fluid may also be used to increase traction and reduce material contact. Traction fluid does not provide increased traction at low speeds or in reversing applications. A material combination which meets or exceeds the high speed traction fluid coefficient is necessary when the device is moving slowly, stopped or reversing. Steel on carbide is an example of a material combination which the inventors have found to have these characteristics. Carbide planet rollers have the advantage of providing higher torque transfer stiffness.

Other material combinations can include any or all of the components made of or coated with a resilient material such as, but not limited to, polyurethane. One embodiment which is envisioned would use steel or aluminum planet rollers with a textured surface which would interface with a resilient layer between the planet rollers and the fixed and output rings. This would provide a very quiet device which may be ideal for prosthetics, where stiffness is less of a concern and some compliance would actually be a benefit.

Gear teeth, either helical or straight cut, or herringbone, may also be used to increase the invention's torque capacity. Gear teeth may be used by themselves or in combination with the rolling elements shown above (for example geared outer race interface with geared sections of planet gears and a rolling interface between the sun gear input and the planets. Note that the gears would have pitch diameters equal to the rolling elements to which they are attached. Gears would provide higher torque in many applications, but would not provide the same level of smoothness and quietness of rolling "traction contact" as described above.

Figure 4:
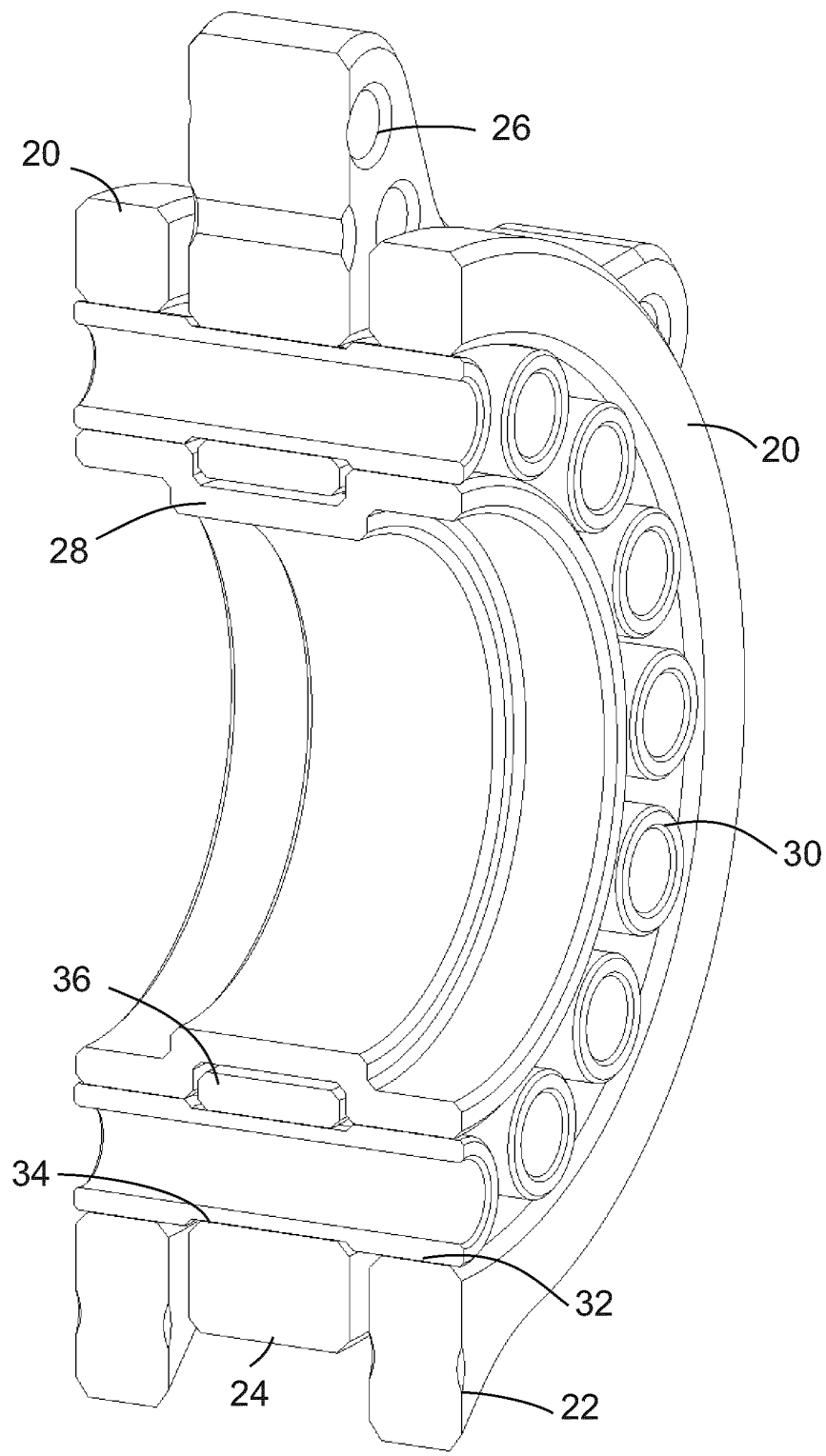
FIG. 4 is an isometric section view of a floating sun roller embodiment of a high ratio rolling contact speed change device.
Figure 5:
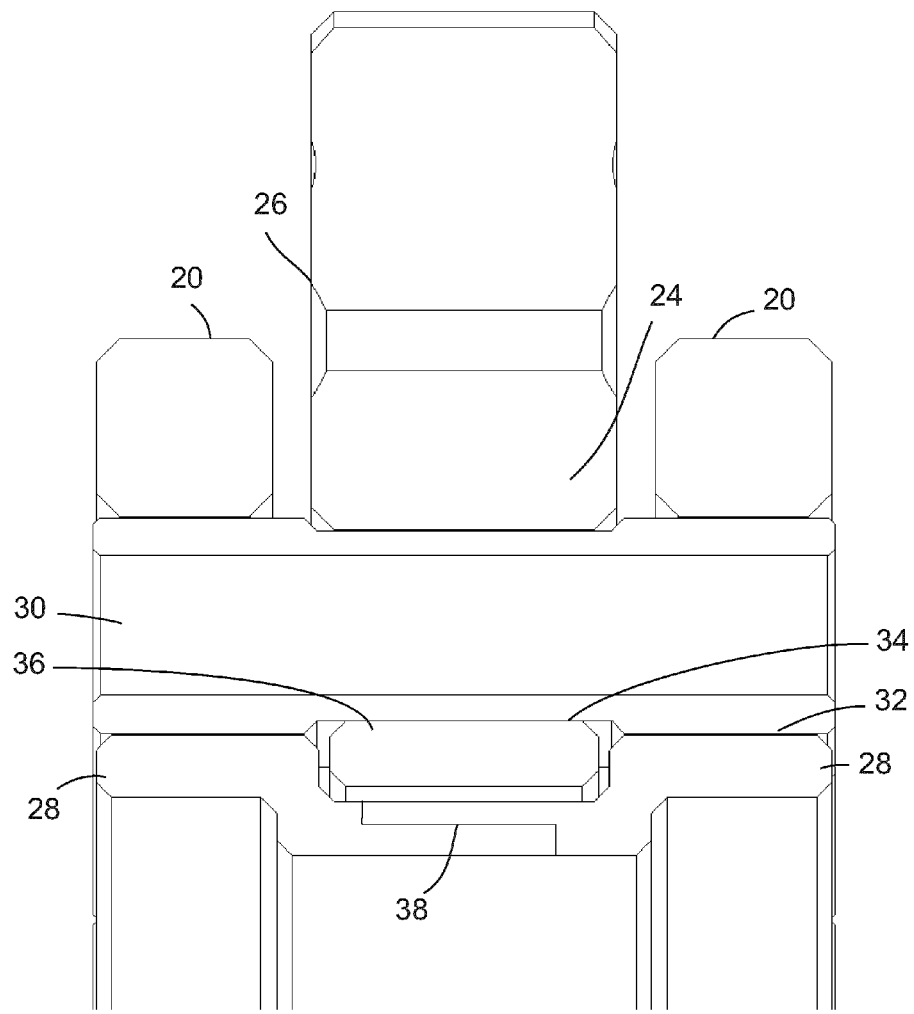
FIG. 5 is a section detail view of the device of FIG. 4.

In FIGS. 4 and 5, a floating, non-driven, secondary sun roller 36 is used to provide radial preload on the inner diameter of the planet rollers. This is especially helpful in providing consistent contact pressure when smaller diameter planet rollers are used. The floating secondary sun roller is free to rotate at a different speed then the sun ring input. This design may also be used to maintain planet roller position in the axial direction. In the embodiment shown the floating sun roller is in rolling contact with middle portion 34 of the planet rollers, and sun roller 28 is arranged to contact the planet rollers at either end. For ease of manufacture the sun roller may be made of two pieces joined together at join 38 as shown in FIG. 5. Floating secondary sun rollers can also be used to provide radial preload on the outer diameters (at either end) of the planet rollers with the driven sun roller contacting the inner diameters of the planet rollers. This would eliminate the need for a two piece sun roller system as shown in FIG. 5.

Figure 6:
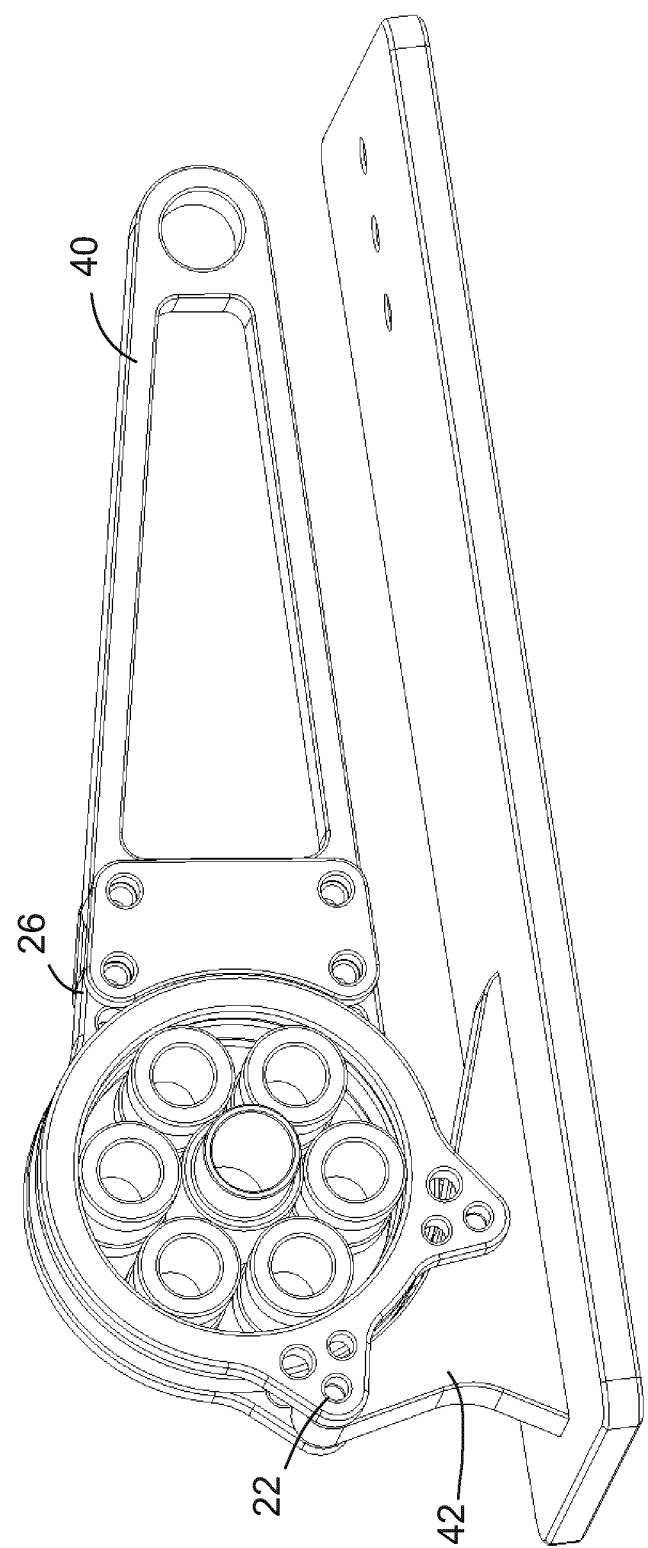
FIG. 6 shows the device of FIG. 1 arranged to move a mechanical arm.

FIG. 6 shows the embodiment of FIGS. 1-3 arranged to move a mechanical arm 40. Fixed ring attachment flanges 22 are attached to a base 42 and output ring attachment flanges 26 are attached to arm 40.

Variations

Many different variations and embodiments are possible and anticipated by the inventor. The embodiments and variations disclosed here are intended to describe the basic operating principles of the device and to describe several of the preferred embodiments for various applications.

Figure 29:
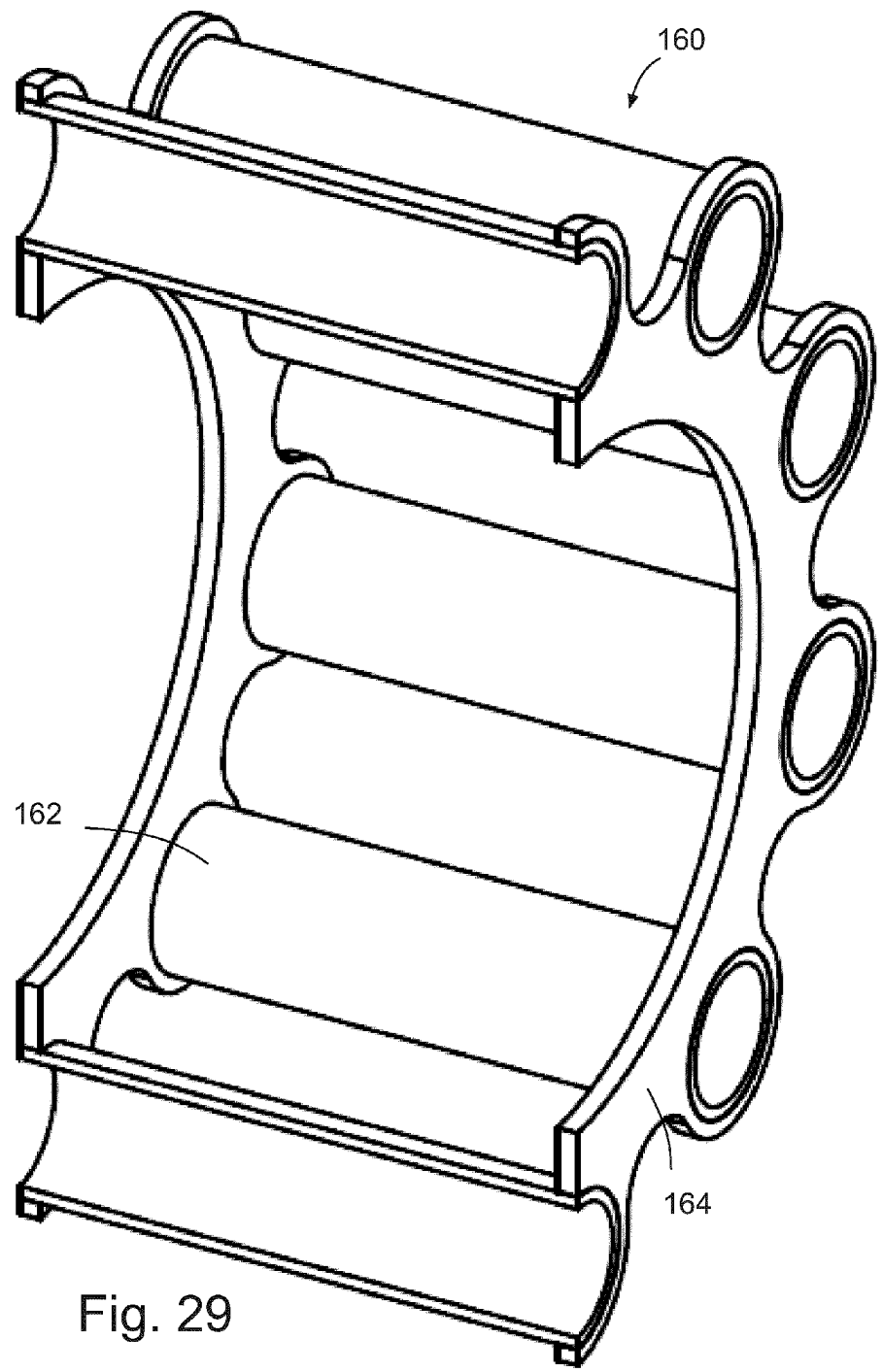
FIG. 29 shows an isometric cutaway view of a planet carrier.
Figure 30:
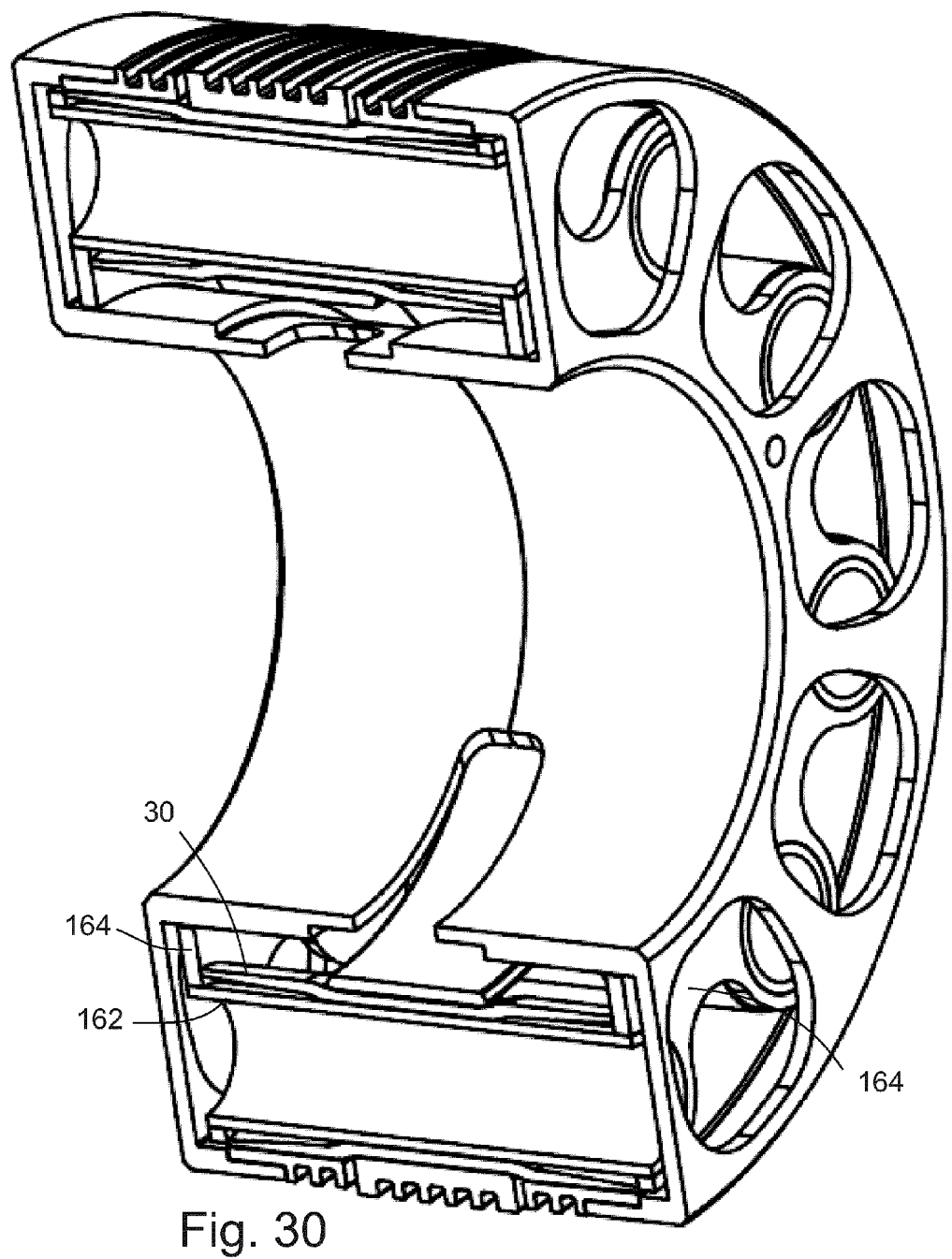
FIG. 30 shows an isometric cutaway view of the planet carrier of FIG. 29 in a gear system.

Variations can include more than one output member (possibly with different speed change ratios; the use of a planet carrier with rolling element bearings to eliminate the need for a sun gear input (In this case the planet carrier would be driven). An example planet carrier which could be used as a drive element is shown in FIGS. 29 and 30. A single fixed member and single output member can be used if a planet carrier is used which prevents the twisting of the planet rollers axes. Tapered rollers can also be used and have the advantage of providing a means of increasing or adjusting preload (by moving races or rollers axially) but tapered rollers are believed to increase friction and therefore reduce efficiency. FIG. 29 shows an isometric cutaway view of a planet carrier 160. The planet carrier 160, also known as a spider, has planet engaging elements 162, here cylindrical components each configured to fit within a planet roller ; and connecting elements 164 connecting the planet engaging elements. FIG. 30 shows an isometric cutaway view of the planet carrier of FIG. 29 in a gear system. Here you can see how planet engaging element 162 fits within roller 30.

Crowning the contact surfaces (ie: creating a slight curvature so the surfaces are not completely cylindrical) of the sun roller and/or the planet rollers and/or the rings is preferable in high load applications to more evenly distribute forces across the entire contact patch. Varying the wall thickness along the axial length of the sun and/or planet and/or ring members is another way to control the force distribution.

FIGS. 1-5 all illustrate the basic embodiment of the device with a few variations such as different numbers of planets, different ratios of sun, planets, and outer ring sizes, and the use of a floating sun ring in some images. It uses two fixed outer rings which are bolted directly together or to a common rigid component such as but not limited to a robotic arm or robotic base.

Figure 7:
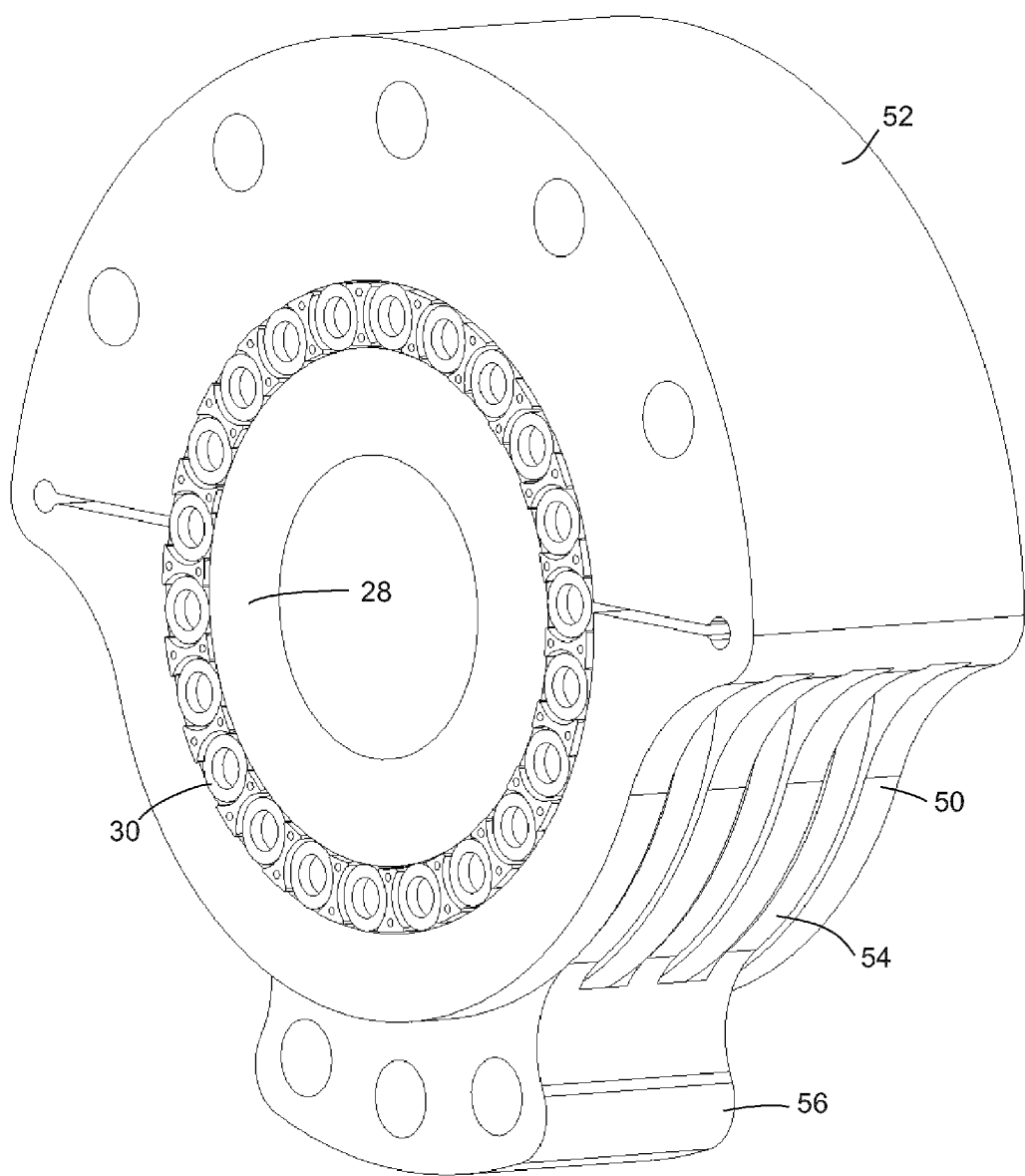
FIG. 7 is an isometric view of an embodiment of a high ratio rolling contact speed change device with additional output rings to provide additional torque.

FIG. 7 illustrates an embodiment designed for additional torque such as for, but not limited to, the movement of a telescope or other beam structure. Four upper housing outer rings 50 are attached to the upper housing 52 which in this embodiment would be movable (or fixed). 3 lower housing outer rings 54 are attached to the lower housing 56 (by any number of rings could be used). The advantage of this system includes increased load on the rollers with less bending deflection due to more consistent loading of the rollers.

Figure 8:
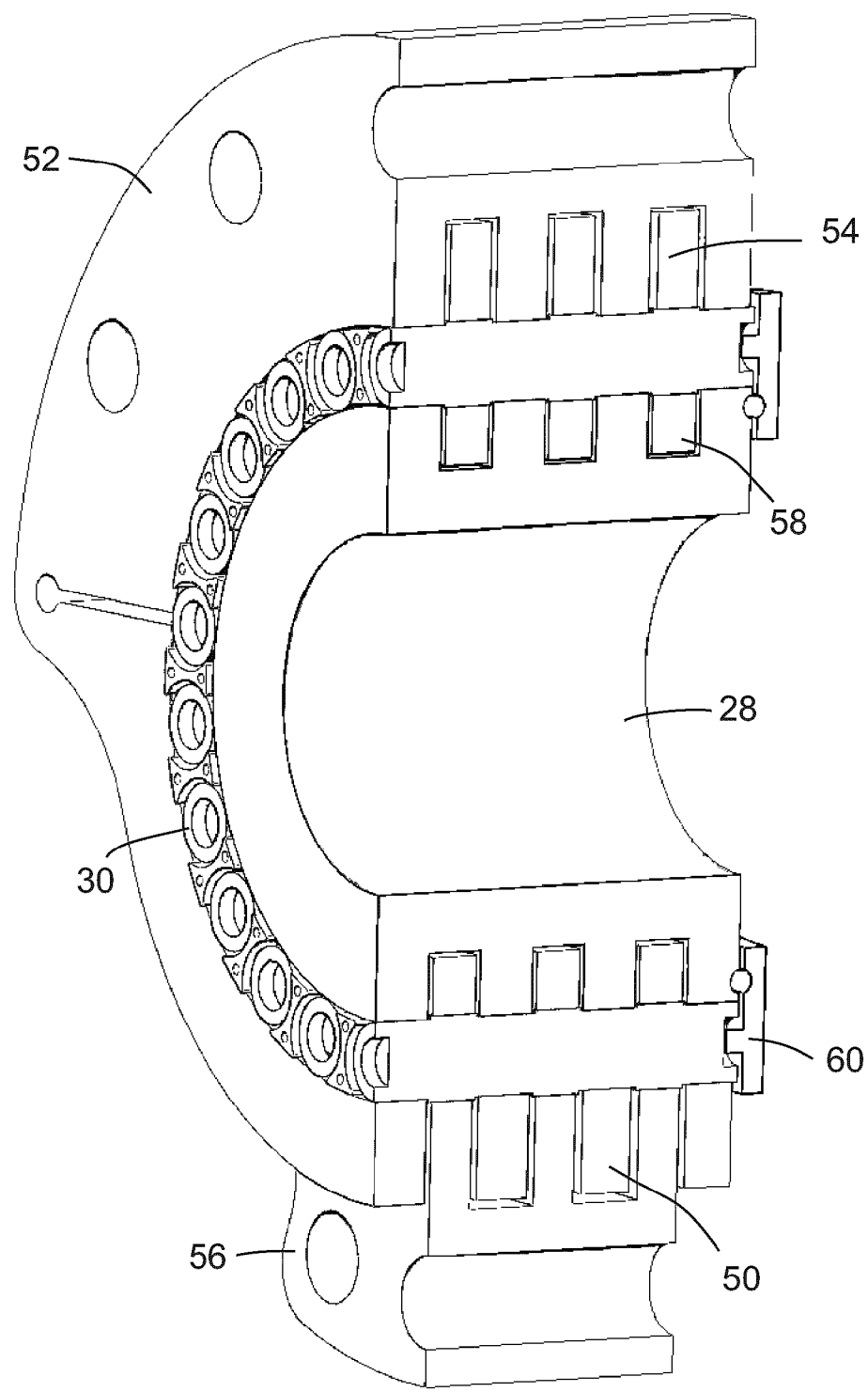
FIG. 8 is a cutaway view of the embodiment of FIG. 7.
Figure 9:
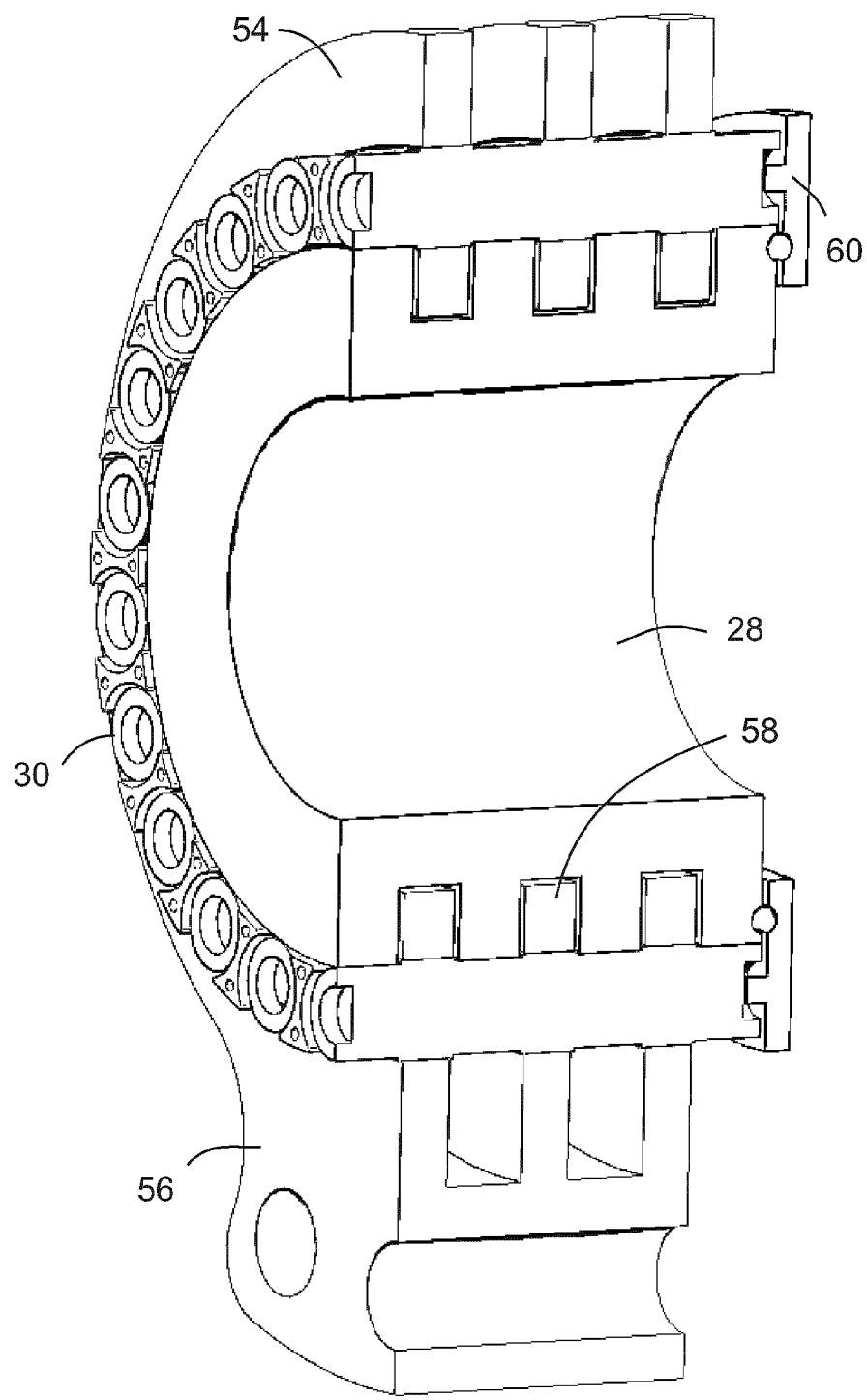
FIG. 9 shows the view of FIG. 8 with the upper housing removed.
Figure 10:
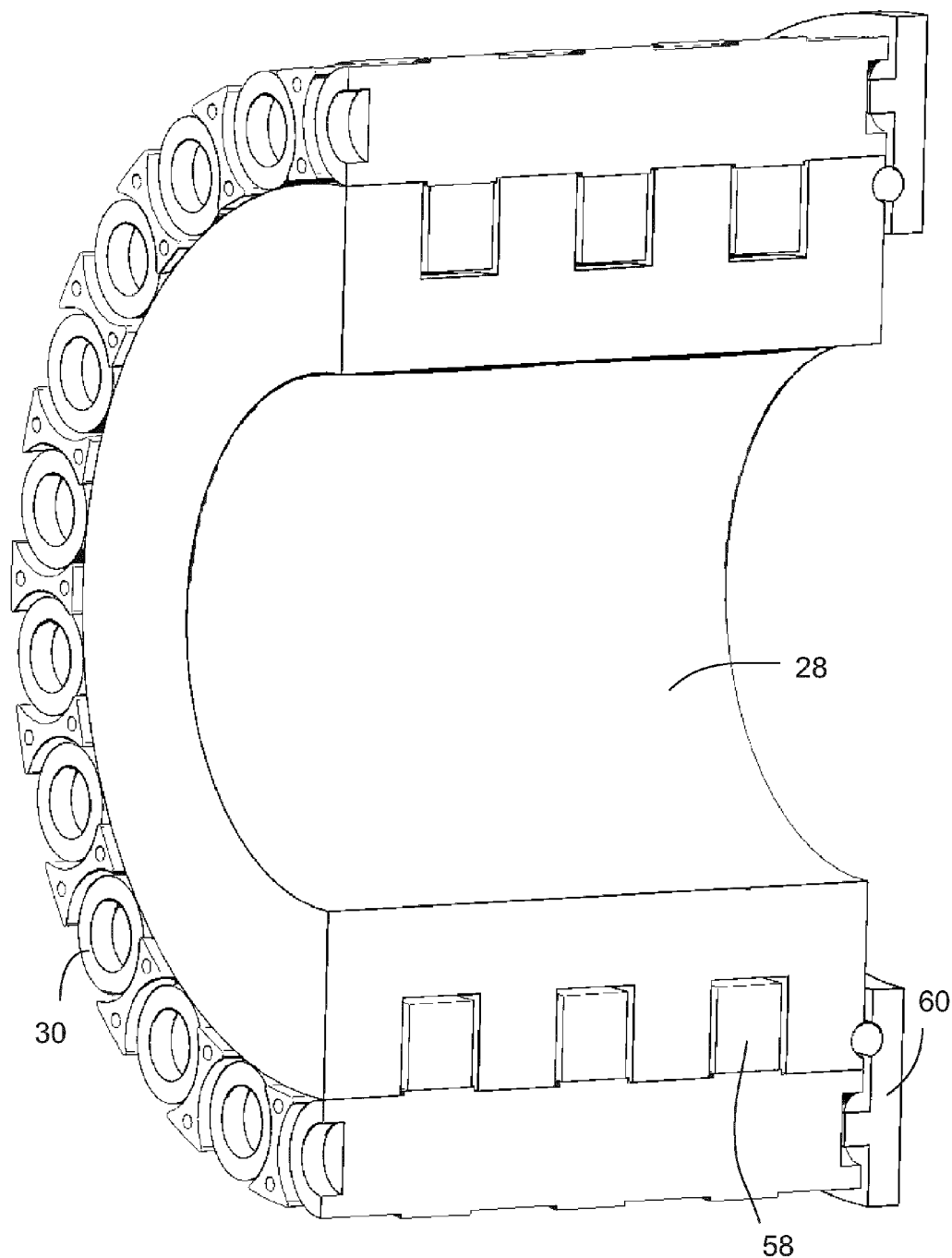
FIG. 10 shows the view of FIG. 9 with the lower housing removed.

This embodiment uses the split outer housing shown here on the uppermost housing. This housing can be bolted together to reduce the inside diameter of the outer race. FIG. 8 shows a section view of the embodiment of FIG. 7. There are 3 floating sun rings 58 in this embodiment. FIG. 9 shows the view of FIG. 8 with the upper housing 52 and upper housing outer rings 50 removed in order to better see the lower housing 56 and lower housing outer rings 54. FIG. 10 shows the same view, in greater magnification, with the lower housing 56 and lower housing outer rings 54 also removed.

Figure 11:
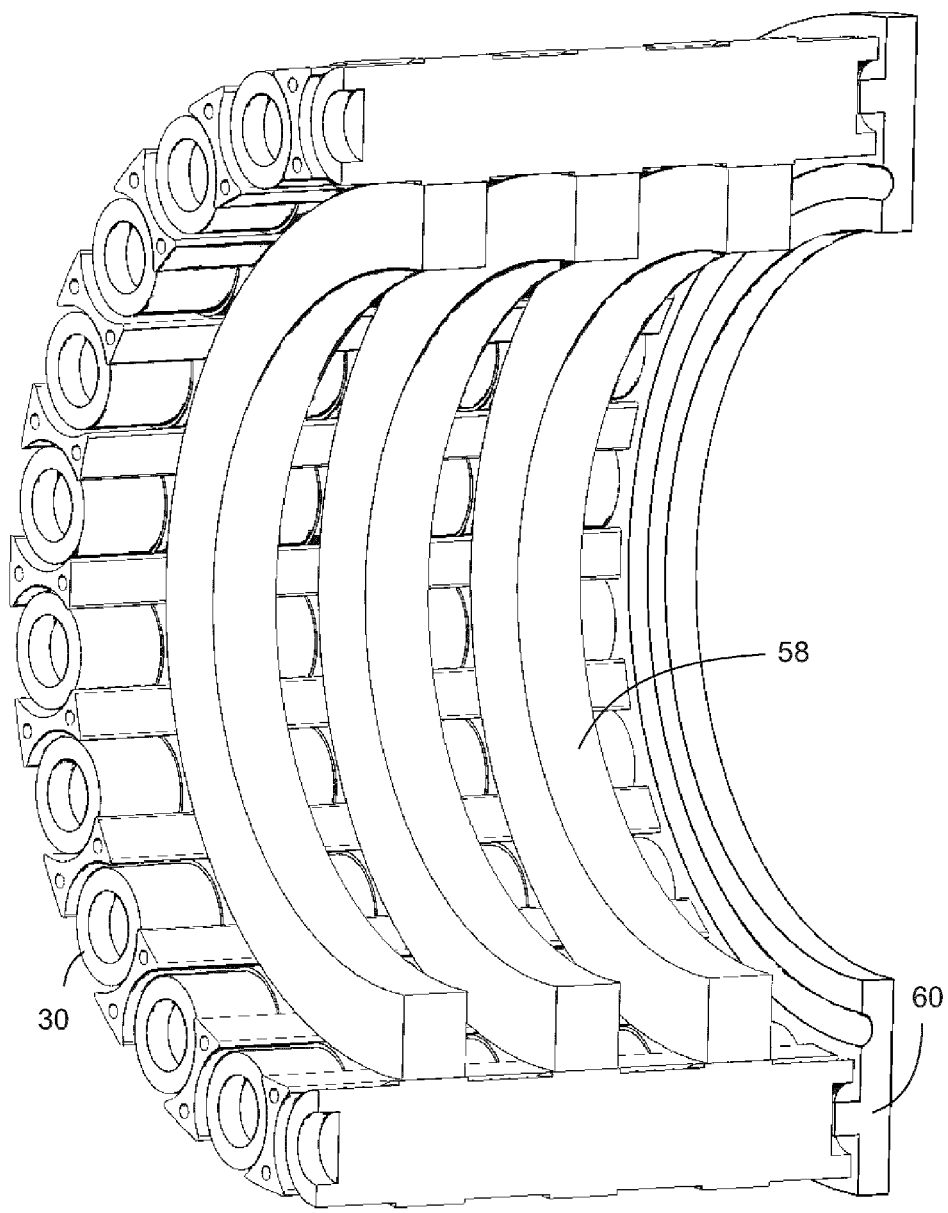
FIG. 11 shows the view of FIG. 10 with the sun roller removed.

FIG. 11 shows the view of FIG. 10 with the sun roller removed to better see the floating sun rings 58.The floating sun rings 58 are axially between the contacts of the sun roller with the planets, and are only contacting the planets to keep them from bending inward.

Figure 12:
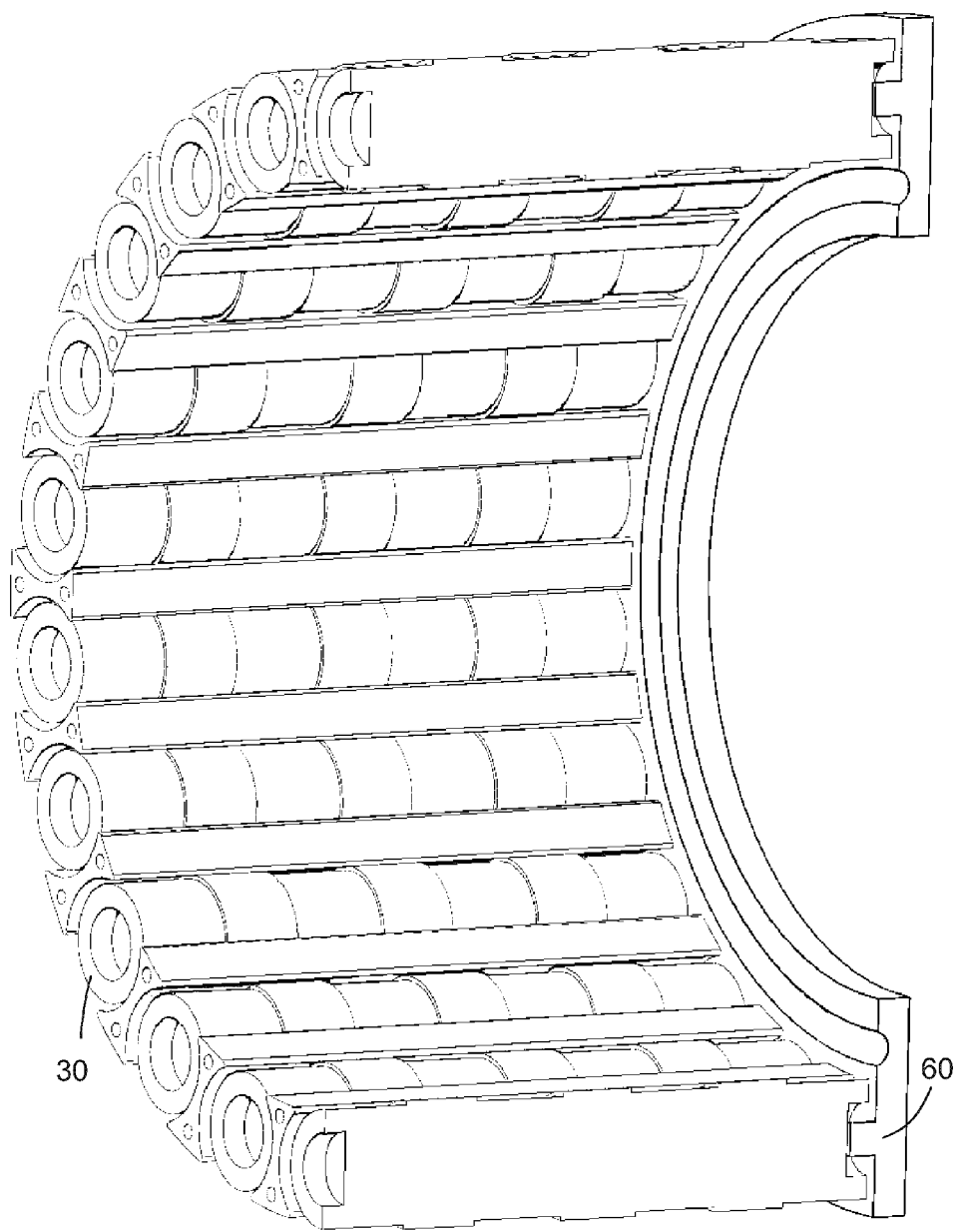
FIG. 12 shows the view of FIG. 11 with the floating sun rings removed.

FIG. 12 shows the view of FIG. 11 with the floating sun rings 58 also removed. Roller cage 60 can optionally provide stability for rollers with bearings or other elements. Cage 60 is shown at one end of the rollers only in FIGS. 7-12 but would be present at both ends of the rollers.

Figure 13:
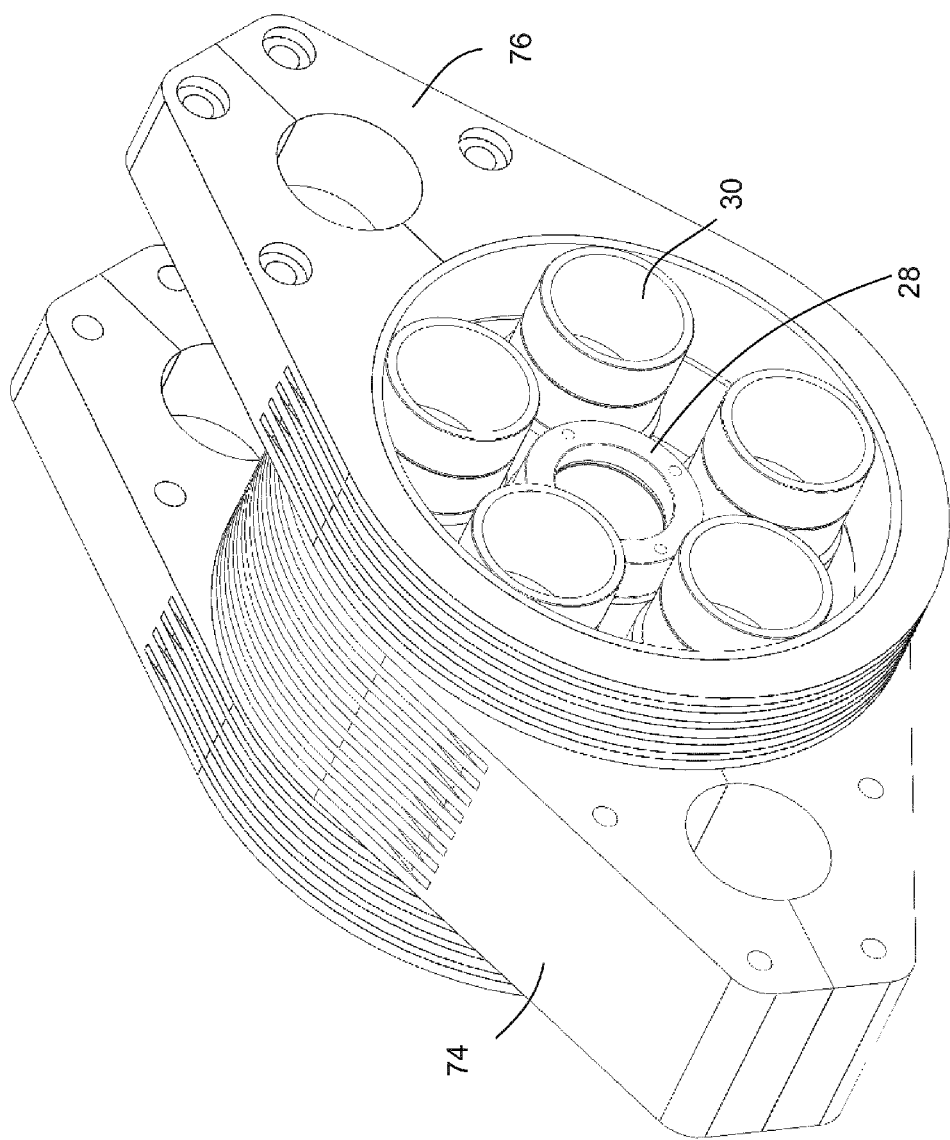
FIG. 13 is an isometric view of a further embodiment of a high ratio rolling contact speed change device.
Figure 14:
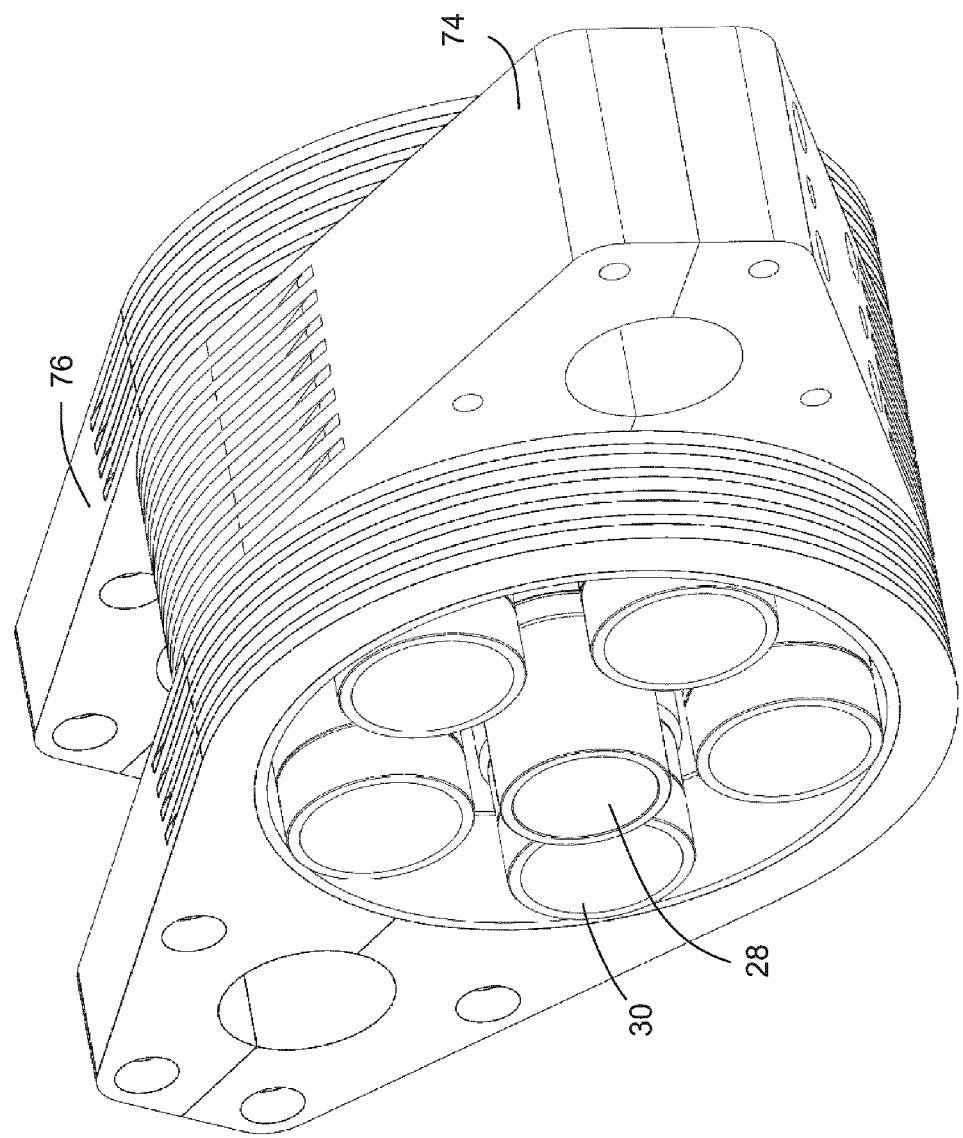
FIG. 14 shows the embodiment of FIG. 13 from a different orientation.

FIG. 13 is an isometric view of a further embodiment of a high ratio rolling contact speed change device, also shown in FIG. 14-19.

In the embodiment of FIGS. 13-19, thin section outer races 70 and 72 are pressed into thicker section outer housing(s) 74 and 76. Preferably, in order to insert the races the outer housings can be increased in size by opening up the slots in the housings, or possibly by thermally expanding them. The hardened race can be a heavier, stiffer material.

The embodiment of FIGS. 13-19 uses a preferably harder material such as, but not limited to hardened steel or ceramic for the outer races. This material is press fit into or clamped into the outer housing members. Also, components are thin section where ever possible to reduce weight. A middle outer housing 74 acts as either output or fixed element, and end outer housings 76 act as the other of output or fixed element. The end outer housing components 76 are intended to be bolted together, or to the same component so that they act as one piece.

Figure 15:
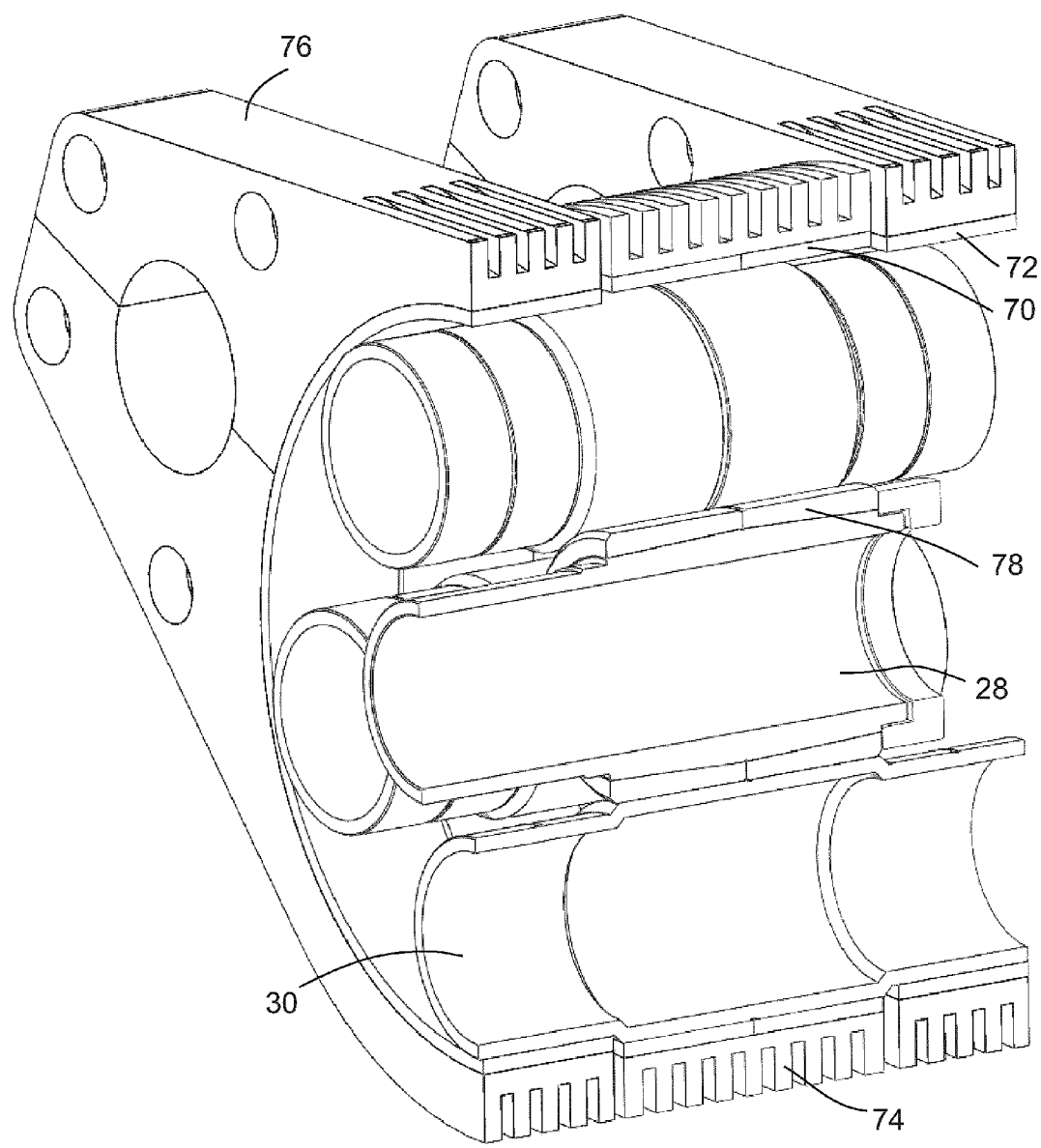
FIG. 15 shows a cutaway view of the embodiment of FIG. 13.
Figure 16:
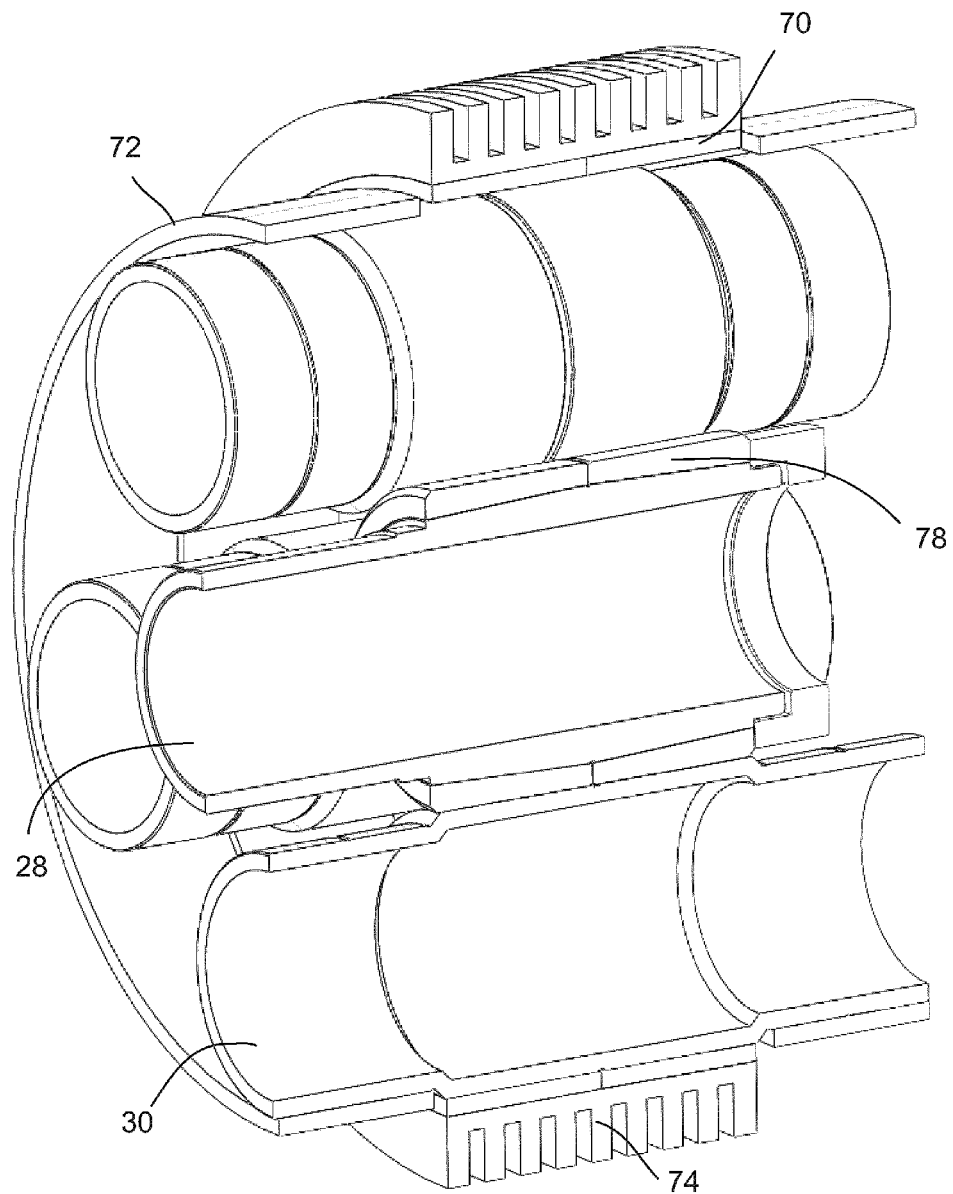
FIG. 16 shows the view of FIG. 15 with end outer housings removed.
Figure 17:
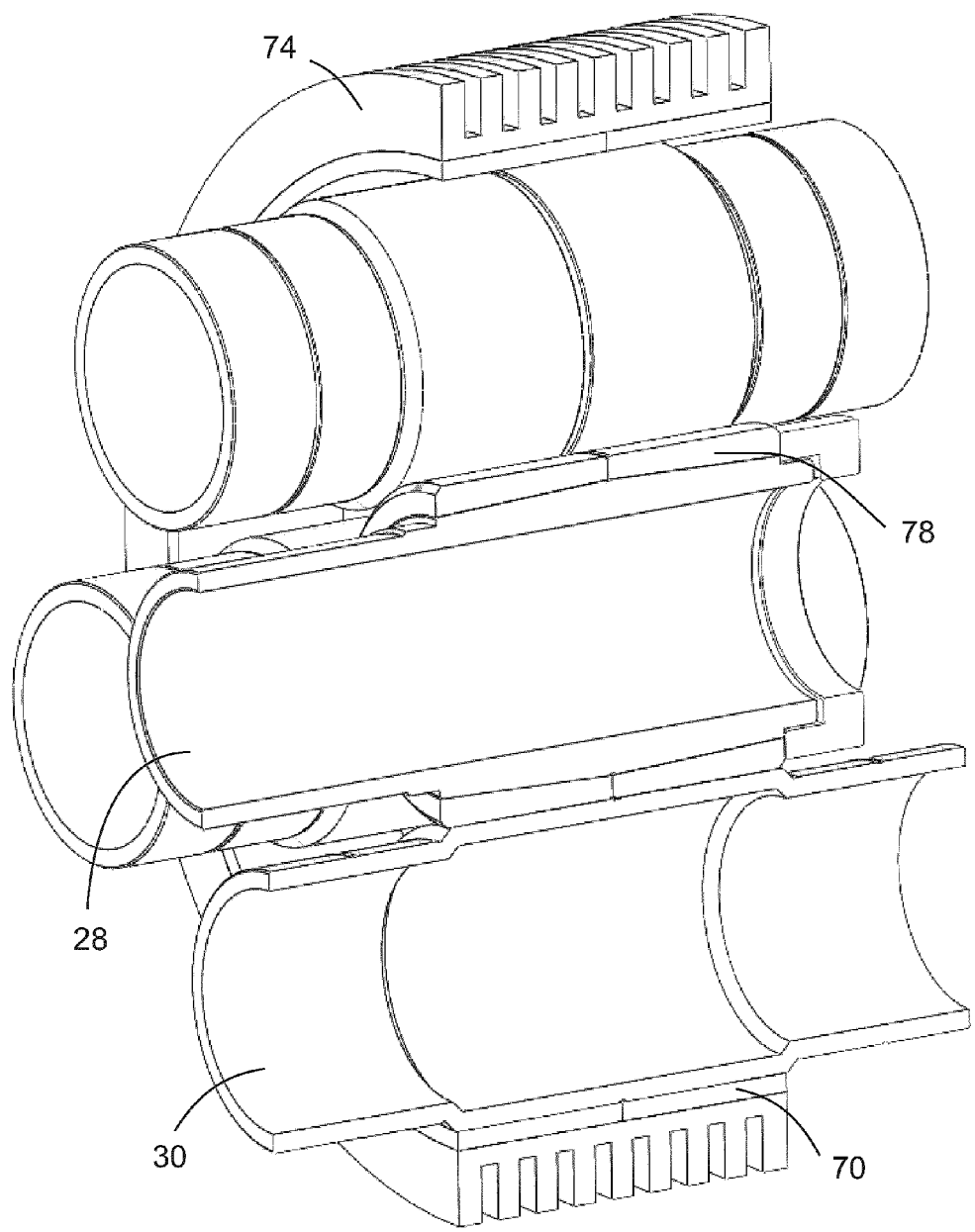
FIG. 17 shows the view of FIG. 16 with a race associated with the end outer housing also removed.
Figure 18:
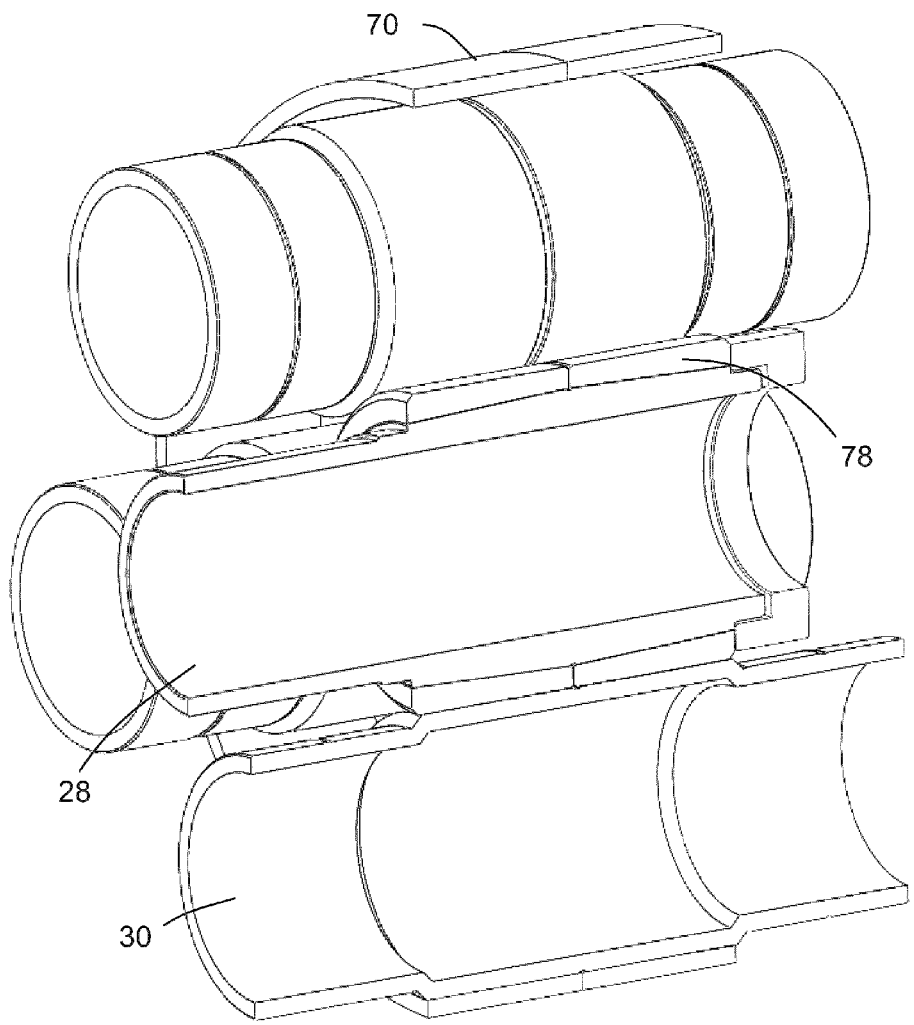
FIG. 18 shows the view of FIG. 17 with the middle outer housing removed.
Figure 19:
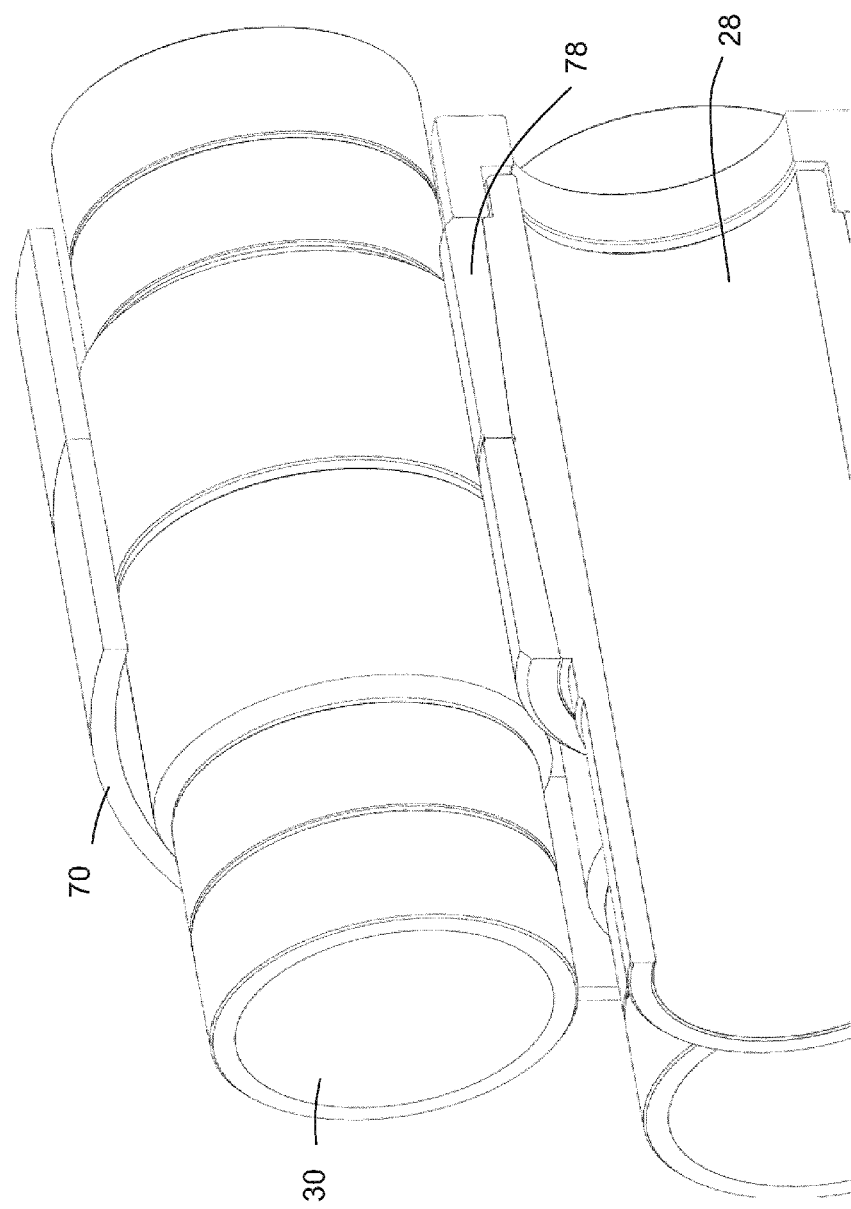
FIG. 19 shows a closeup view of a portion of the view of FIG. 18.

FIG. 15 shows a cutaway view of the embodiment of FIG. 13. The inner race 78 shown here and in FIGS. 16-19 has a tapered interface with the sun roller drive so that it can be actually moved together, preferably with the threaded not as shown on one end (but not shown on the other in this image). This tapered interface allows assembly with reduced interference or no interference, and expansion of these sun races to increase the preload of the system. This can also be used to make up for wear over time. As with a number of these embodiments, the rollers can be larger diameter at either end (respective tapered portions narrow inwardly) instead of toward the center as shown above (respective tapered portions narrow outwardly).

Figure 20:
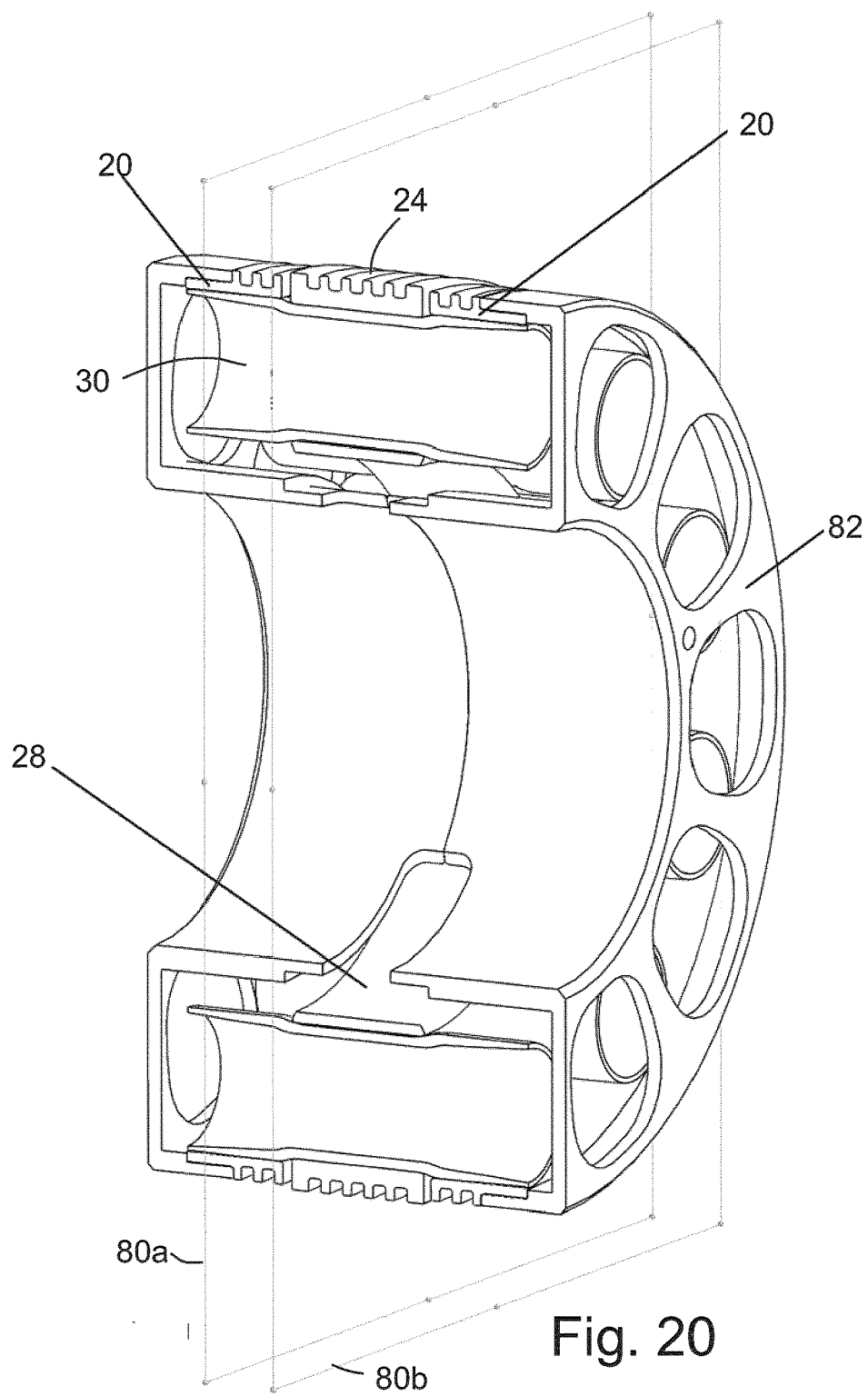
FIG. 20 is a isometric section view of an embodiment with tapered rollers.
Figure 21:
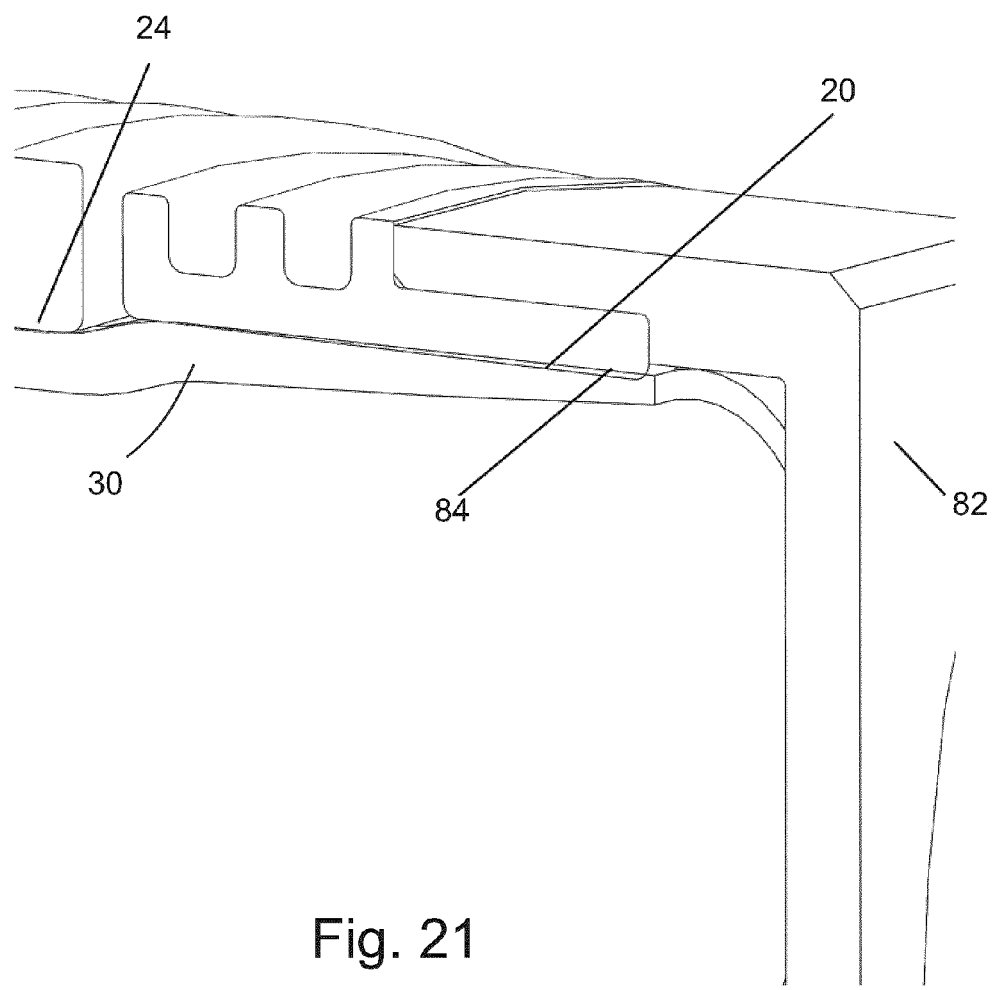
FIG. 21 is a closeup of a tapered portion of the embodiment of FIG. 20.
Figure 22:
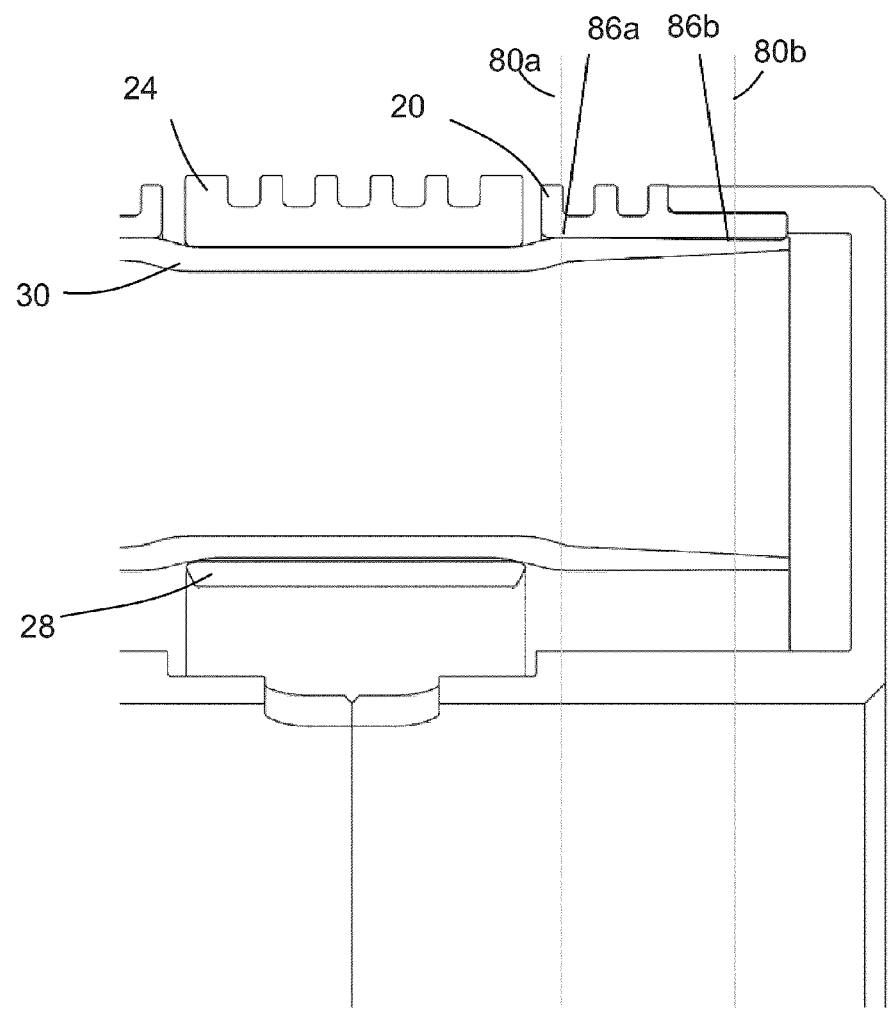
FIG. 22 is a section view of the embodiment of FIG. 20.

In an embodiment of the device shown in FIGS. 20-22, the rollers 30 are tapered toward both ends at an angle X. The roller wall are thin enough to allow elliptical deformation within the elastic limit of the material. The fixed rings 20 are also tapered inward toward the axial outer edges but at an angle which is greater than the roller angle by the ratio of roller outer diameter (OD) to fixed ring inner diameter (ID). For example, if the rollers are 1" in diameter at an axial plane (EG Plane 1 in FIGS. 1 and 3) and the fixed ring is 10" in diameter on that plane, the taper of the rollers may be 0.1 degree and the taper of the fixed ring will be 1 degree. As shown in FIG. 21, the rollers have interference 84 with the fixed ring taper before assembly. As a result, the rollers can be preloaded so all or part of the roller taper contacts all or part of the ID fix ring taper with the elastic compression of the rollers allowing the desired line contact. Matching the taper angle ratio with the diameter ratio allows both taper surfaces to maintain rolling contact with little or no sliding because the ratio of circumferential length of the roller OD's is equal or near equal to the circumferential length of the fixed ring ID at all points of contact between the two tapers. The advantage of the tapered engagement is axial positioning of the rollers to reduce or eliminate the need for an alignment cage and bearings for the rollers. In the embodiment shown output ring 24 has a cylindrical ID but it can be differently shaped. As shown in FIG. 20, a housing 82 preferably connects both fixed rings together. Sun ring 28 provides radial load on rollers and input torque and can be driven by various means such as but not limited to a direct drive electric motor (not shown).

Another way to define the ratio of the tapered rollers to the tapered fixed ring, is to measure the OD of the roller and the ID of the ring along two or more planes 80a, 80b at different distances from the center plane as shown in FIG. 22. The ratio of the roller OD to the fixed ring ID is preferably the same or similar at the intersection 86a with plane 80a as at intersection 86b with plane 80b. The closer these ratios are to equal, the less sliding there will be while rolling.

Variations to this embodiment anticipated by the inventor include crowning of the tapered contact surfaces for various effects.

Figure 23:
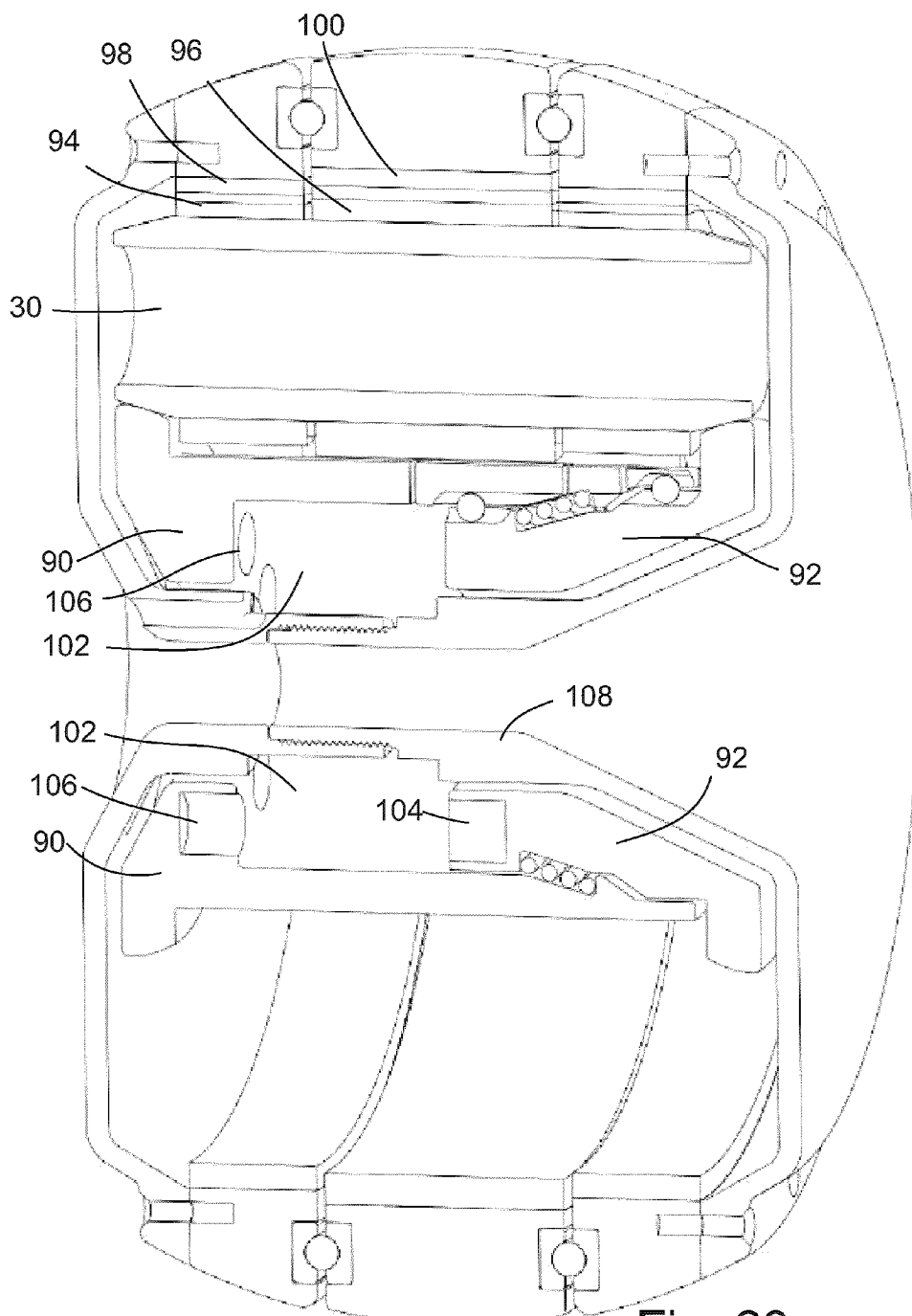
FIG. 23 shows a simplified section view of an embodiment with geared fixed and outer rings, geared rollers to transmit torque between these, and a rolling contact sun ring-to-roller interface.

FIG. 23 shows a simplified section view of an embodiment with geared fixed and outer rings, geared rollers to transmit torque between these, and a rolling contact sun ring-to-roller interface. the sun ring input is provided by a roller engagement (sun ring elements 90 and 92). The sun ring interface is shown as tapered for self-centering but can be cylindrical or other shapes.

The roller gears 94 and 96 on roller 30 are not shown with teeth for simplicity of illustration. Fixed gear 98 is also simplified as is output gear 100.

The sun ring parts 90 and 92 are preferably rotationally fixed together with the linear bearings (two larger balls shown near ID of sun), and a spring is optionally used (four small section circles in a tapered array) to provide the required preload on the tapered sun faces.

An array of electromagnets (not shown but intended to be fixed to the housing 108 inside the rectangular opening 102 in the sun ring parts) pulls on the permanent magnets (one shown as element 104, but the holes 106 in element 90 will house them as well) to provide rotary input and also to pull the two halves of the sun together for greater traction and gear tooth radial loading when required under higher loads.

Figure 24:
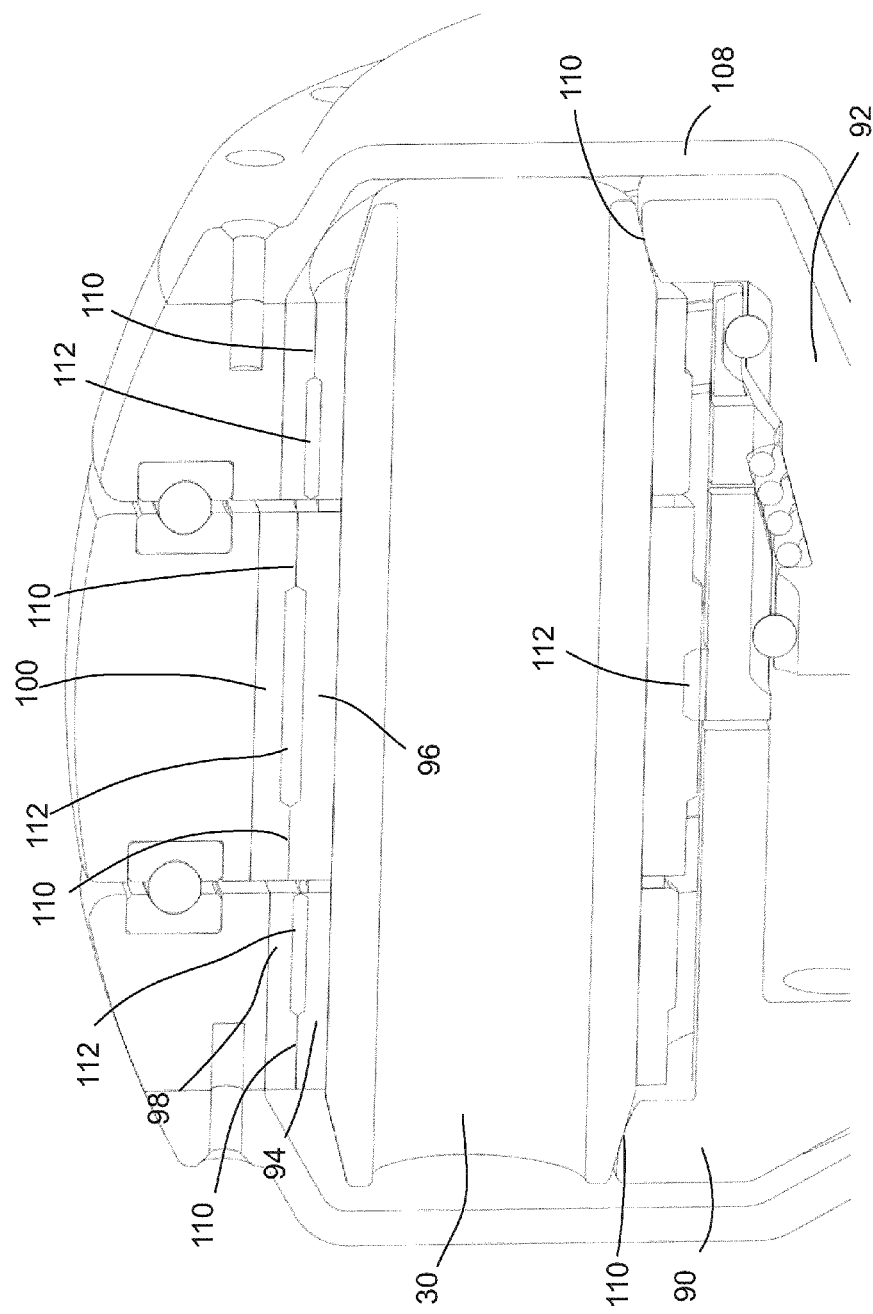
FIG. 24 shows a closeup view of a variation of the embodiment of FIG. 23 combining geared and rolling surfaces.

FIG. 24 shows a closeup view of a variation of the embodiment of FIG. 23 combining geared and rolling surfaces. Although geared is used here in contrast to rolling, in the claims the term "rolling" should be interpreted to encompass geared as well. Interfaces 110 have rolling contact and interfaces 112 are geared interfaces. The rolling surfaces are preferably at or near the the pitch diameters of the gears.

FIGS. 25-27B show an exemplary geared embodiment. The gears shown here are helical, but could be spur gears or other types. Aspects of this embodiment can apply to other embodiments.

The sun components 120 and 122 are rotationally attached to the fixed housing 124 with two bearings 126. Sun gear 128 provides rotational input to the rollers 130 with one roller shown here but an array of rollers is preferred. The roller gear 128 interfaces to the output gear 132 which is fixed to the output member 134. The fixed members 136 are rigidly attached to the housing members 124 which ensure that they do not rotate relative to each other. The gears 138 on both ends of the rollers are fixed to the roller (such as by press fitting or bonding) and mesh with the fixed gears 140 with are fixed to the fixed members 136.

Sun components 120 and 122 can be rotationally driven by many different means. Shown here as an example are an array of permanent magnets 142 which are acted on by the schematic electro magnets 144. Air or hydraulic input to rotate the sun are other non-limiting examples of rotary input options. The two large bearings 146 between the fixed and output members rotationally support the output gear and output member relative to the fixed housing/members.

L-shaped members 148 on the sun components are optional and can slide axially and preferably spring inward (springs not shown) to provide a rolling contact between the blue sun member and the rollers, thereby reducing the gear cogging of the sun gear if it were to be radially preloaded. By making the geared rollers thin walled enough, they can elastically deform to make up for size variations due to manufacturing and heat expansion or wear.

Figure 25:
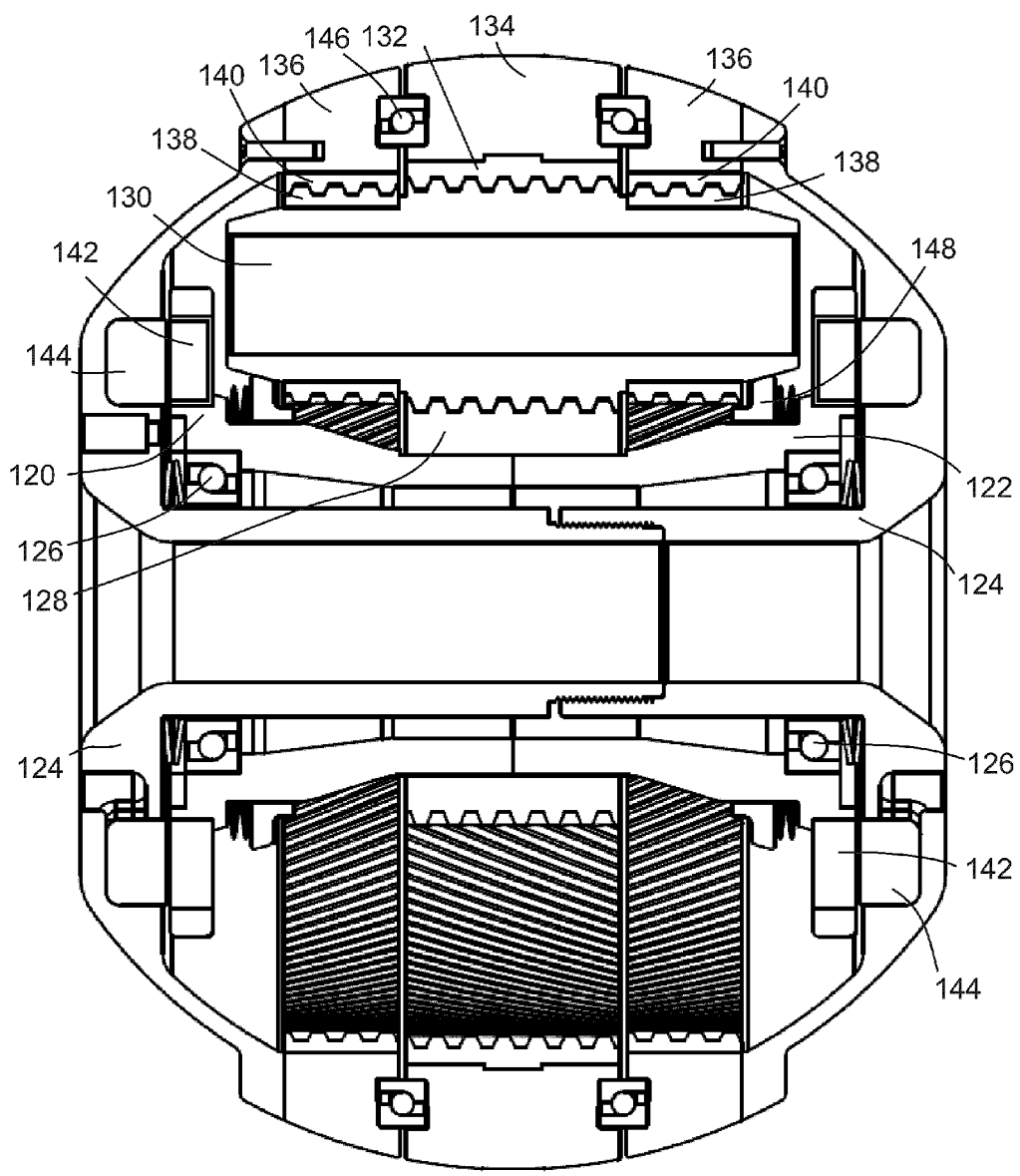
FIG. 25 shows an exemplary geared embodiment.
Figure 26:
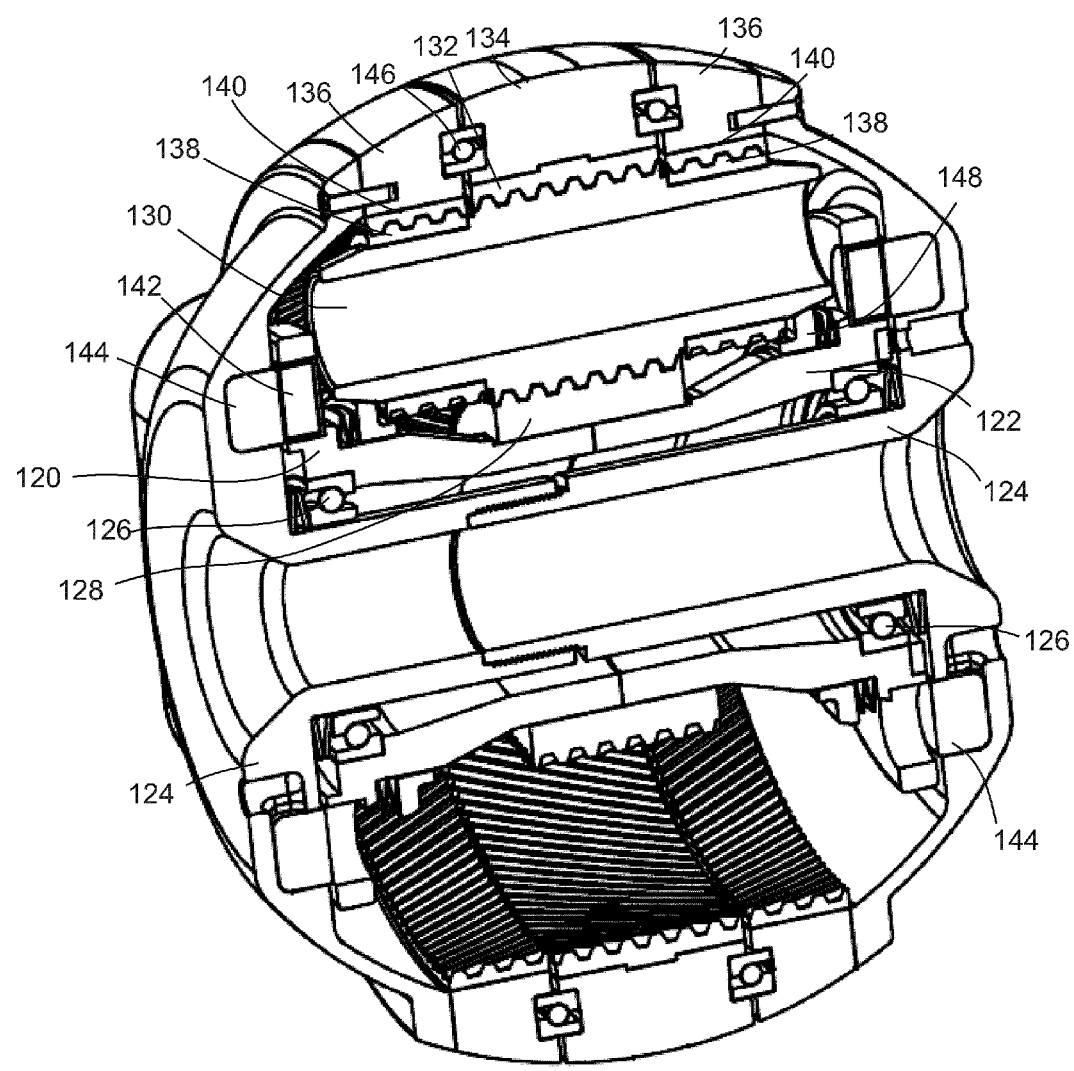
FIG. 26 shows an isometric view of the embodiment of FIG. 25.
Figure 27B:
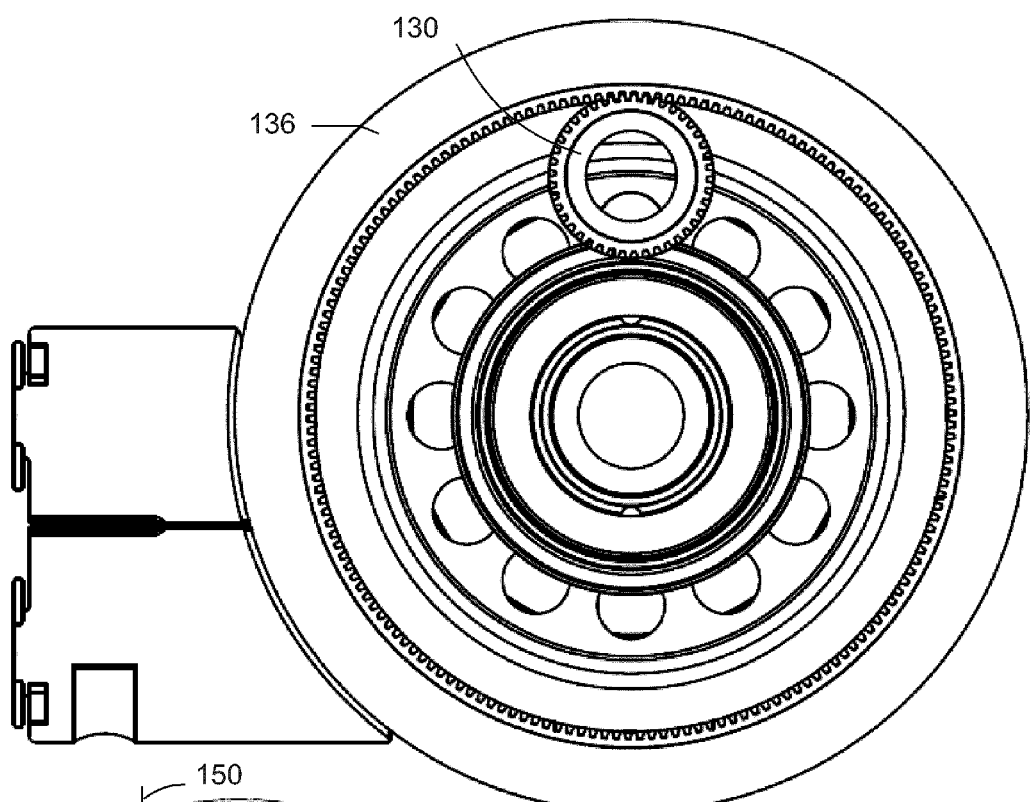
FIGS. 27B and 28B show section views on the planes 150 and 152 indicated by FIGS. 27A and 28A respectively.
Figure 27A:
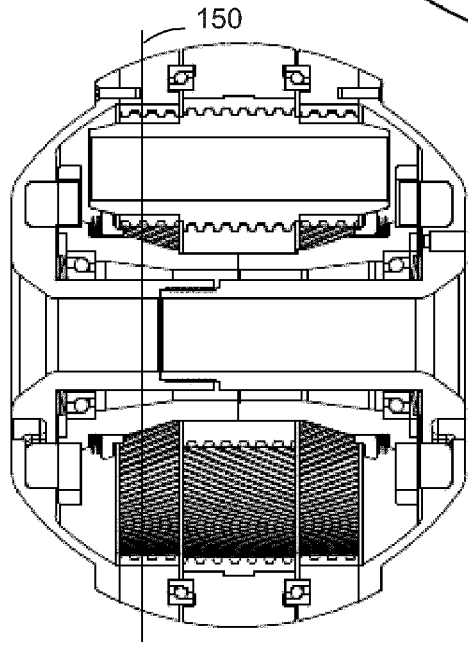
Figures 28A, 28B:
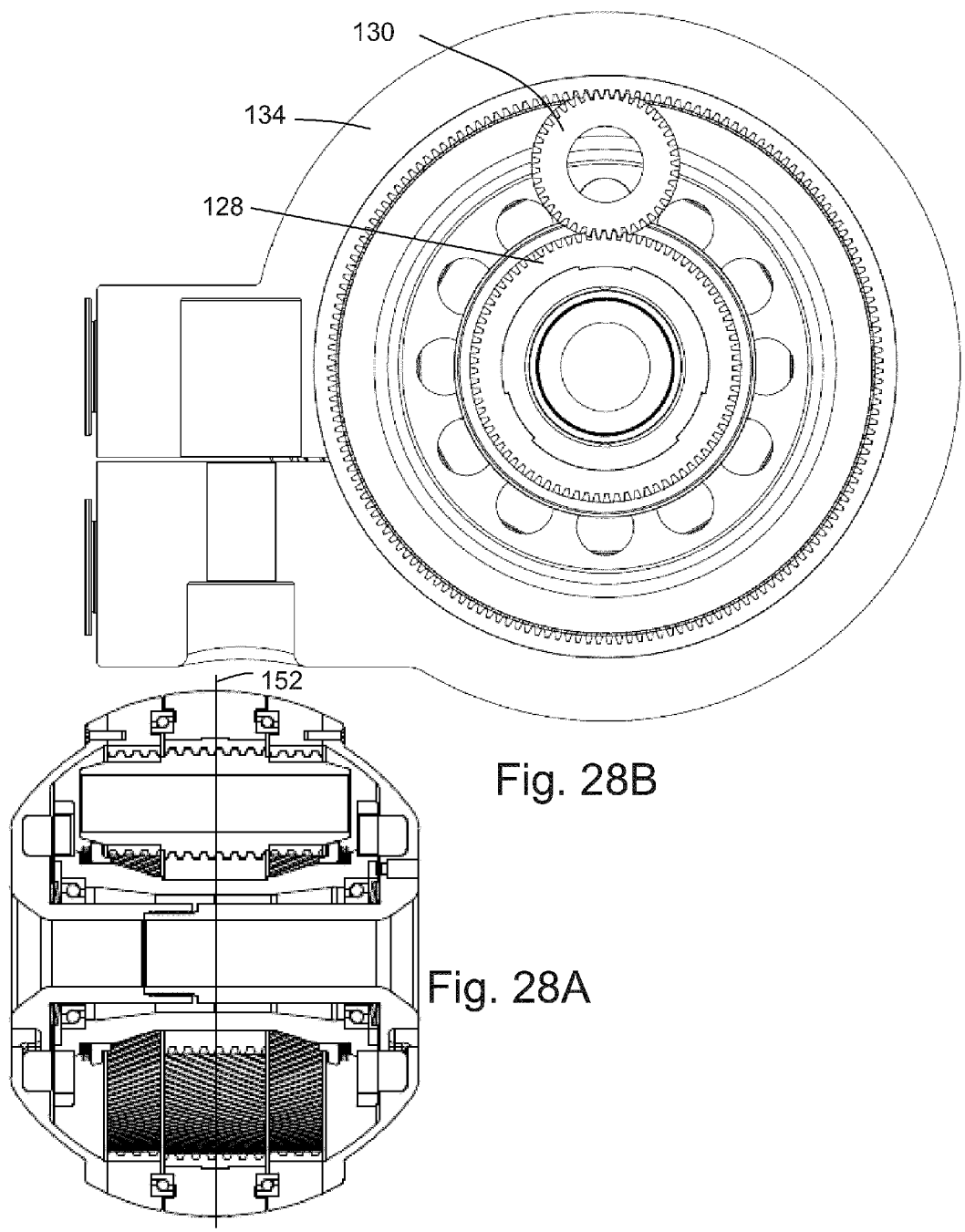

FIG. 26 shows an isometric view of the embodiment of FIG. 25, and FIGS. 27B and 28B show section views on the planes 150 and 152 indicated by FIGS. 27A and 28A respectively.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A drive system comprising:
   rollers, each roller having a first portion of a first diameter and a second portion of a second diameter, the rollers being planet rollers;
   a fixed outer ring arranged in rolling contact with the respective first portion of each roller;
   an outer drive or driven ring arranged in rolling contact with the respective second portion of each roller;
   a sun drive roller arranged in rolling contact with the planet rollers; and
   a floating sun roller arranged in rolling contact with the respective second portion of each roller, the sun drive roller being arranged in rolling contact with the respective first portion of each roller.

2. The drive system of claim 1 arranged as a speed reducer in which the sun drive roller provides an input and the outer driven ring provides an output.

3. The drive system of claim 1 arranged as a speed increaser in which the sun drive roller provides an output and the outer drive ring provides an input.

4. The drive system of claim 1 further comprising a planet carrier drive element arranged to rotate with the planet rollers around an axis defined by the outer drive or driven ring.

5. The drive system of claim 4 arranged as a speed reducer in which the planet carrier drive element provides an input and the outer driven ring provides an output.

6. The drive system of claim 4 arranged as a speed increaser in which the planet carrier drive element provides an output and the outer drive ring provides an input.

7. The drive system of claim 4 further comprising a first floating sun roller arranged in rolling contact with the respective first portion of each planet roller and a second floating sun roller arranged in rolling contact with the respective second portion of each planet roller.

8. The drive system of claim 1 in which the first diameter is greater than the second diameter.

9. The drive system of claim 1 in which the first diameter is less than the second diameter.

10. The drive system of claim 1 in which the fixed outer ring is a first fixed outer ring and the drive system further comprises a second fixed outer ring, the first fixed outer ring and the second fixed outer ring being arranged symmetrically one on each side of the outer drive or driven ring.

11. The drive system of claim 1 in which the outer drive or driven ring is a first outer drive or driven ring and the drive system further comprises a second outer drive or driven ring, the first outer drive or driven ring and the second outer drive or driven ring being arranged symmetrically one on each side of the fixed outer ring, and being connected to each other to rotate together.

12. The drive system of claim 1 further comprising gear teeth on one or more pairs of surfaces in rolling contact.

13. The drive system of claim 1 in which the planet rollers are tapered, with respective tapered portions narrowing inwardly or outwardly.

14. The drive system of claim 13 in which surfaces contacting the respective tapered portions are correspondingly tapered.

15. The drive system of claim 14 in which the surfaces contacting the respective tapered portions are tapered in ratios corresponding to the ratios of the diameters of the respective tapered portions at the contacting surfaces.

16. The drive system of claim 1 in which the planet rollers have a reflective symmetry with respect to a plane, the planet rollers defining respective axes perpendicular to the plane.

17. The drive system of claim 16 in which elements of the sun drive roller in rolling contact with the planet rollers define axes perpendicular to the plane and collectively have a reflective symmetry with respect to the plane.

18. The drive system of claim 1 in which the planet rollers are hollow.

19. A drive system comprising:
   rollers, each roller having a first portion of a first diameter and a second portion of a second diameter, the rollers being planet rollers;
   a fixed outer ring arranged in rolling contact with the respective first portion of each roller;
   an outer drive or driven ring arranged in rolling contact with the respective second portion of each roller;
   a sun drive roller arranged in rolling contact with the planet rollers; and
   a floating sun roller arranged in rolling contact with the respective first portion of each roller, the sun drive roller being arranged in rolling contact with the respective second portion of each roller.

20. The drive system of claim 19 arranged as a speed reducer in which the sun drive roller provides an input and the outer driven ring provides an output.

21. The drive system of claim 19 arranged as a speed increaser in which the sun drive roller provides an output and the outer drive ring provides an input.

22. The drive system of claim 19 further comprising a planet carrier drive element arranged to rotate with the planet rollers around an axis defined by the outer drive or driven ring.

23. The drive system of claim 22 arranged as a speed reducer in which the planet carrier drive element provides an input and the outer driven ring provides an output.

24. The drive system of claim 22 arranged as a speed increaser in which the planet carrier drive element provides an output and the outer drive ring provides an input.

25. The drive system of claim 19 in which the first diameter is greater than the second diameter.

26. The drive system of claim 19 in which the first diameter is less than the second diameter.

27. The drive system of claim 19 further comprising gear teeth on one or more pairs of surfaces in rolling contact.

28. The drive system of claim 19 in which the planet rollers are tapered, with respective tapered portions narrowing inwardly or outwardly.

29. The drive system of claim 28 in which surfaces contacting the respective tapered portions are correspondingly tapered.

30. The drive system of claim 29 in which the surfaces contacting the respective tapered portions are tapered in ratios corresponding to the ratios of the diameters of the respective tapered portions at the contacting surfaces.

31. The drive system of claim 19 in which the planet rollers have a reflective symmetry with respect to a plane, the planet rollers defining respective axes perpendicular to the plane.

32. The drive system of claim 31 in which elements of the sun drive roller in rolling contact with the planet rollers define axes perpendicular to the plane and collectively have a reflective symmetry with respect to the plane.

33. The drive system of claim 19 in which the planet rollers are hollow.

34. A drive system comprising:
rollers, each roller having a first portion of a first diameter and a second portion of a second diameter, the rollers being planet rollers;
a fixed outer ring arranged in rolling contact with the respective first portion of each roller;
an outer drive or driven ring arranged in rolling contact with the respective second portion of each roller;
a sun drive roller arranged in rolling contact with the planet rollers;
a planet carrier drive element arranged to rotate with the planet rollers around an axis defined by the outer drive or driven ring; and
a first floating sun roller arranged in rolling contact with the respective first portion of each planet roller and a second floating sun roller arranged in rolling contact with the respective second portion of each planet roller.

35. The drive system of claim 34 further comprising gear teeth on one or more pairs of surfaces in rolling contact.

36. The drive system of claim 34 in which the planet rollers are tapered, with respective tapered portions narrowing inwardly or outwardly.

37. The drive system of claim 36 in which surfaces contacting the respective tapered portions are correspondingly tapered.

38. The drive system of claim 37 in which the surfaces contacting the respective tapered portions are tapered in ratios corresponding to the ratios of the diameters of the respective tapered portions at the contacting surfaces.

39. The drive system of claim 34 in which the planet rollers have a reflective symmetry with respect to a plane, the planet rollers defining respective axes perpendicular to the plane.

40. The drive system of claim 39 in which elements of the sun drive roller in rolling contact with the planet rollers define axes perpendicular to the plane and collectively have a reflective symmetry with respect to the plane.

41. The drive system of claim 34 in which the planet rollers are hollow.

42. A drive system comprising:
rollers, each roller having a first portion of a first diameter and a second portion of a second diameter;
a fixed outer ring arranged in rolling contact with the respective first portion of each roller; and
an outer drive or driven ring arranged in rolling contact with the respective second portion of each roller;
in which the fixed outer ring is a first fixed outer ring and the drive system further comprises a second fixed outer ring, the first fixed outer ring and the second fixed outer ring being arranged symmetrically one on each side of the outer drive or driven ring.

43. The drive system of claim 42 further comprising gear teeth on one or more pairs of surfaces in rolling contact.

44. The drive system of claim 42 in which the rollers are tapered, with respective tapered portions narrowing inwardly or outwardly.

45. The drive system of claim 44 in which surfaces contacting the respective tapered portions are correspondingly tapered.

46. The drive system of claim 45 in which the surfaces contacting the respective tapered portions are tapered in ratios corresponding to the ratios of the diameters of the respective tapered portions at the contacting surfaces.

47. The drive system of claim 42 in which the rollers have a reflective symmetry with respect to a plane, the rollers defining respective axes perpendicular to the plane.

48. The drive system of claim 47 in which the rollers are planet rollers, the drive system further comprising a sun drive roller arranged in rolling contact with the planet rollers, and in which elements of the sun drive roller in rolling contact with the planet rollers define axes perpendicular to the plane and collectively have a reflective symmetry with respect to the plane.

49. The drive system of claim 42 in which the first fixed outer ring and the second fixed outer ring are connected to each other.

50. The drive system of claim 49 in which the rollers are planet rollers, the drive system further comprising a sun drive roller arranged in rolling contact with the planet rollers, and in which the first fixed outer ring and the second fixed outer ring are connected to each other via a connection portion axially traversing an axial through hole of the sun drive roller.

51. The drive system of claim 42 in which the rollers are hollow.

52. A drive system comprising:
rollers, each roller having a first portion of a first diameter and a second portion of a second diameter;
a fixed outer ring arranged in rolling contact with the respective first portion of each roller; and
an outer drive or driven ring arranged in rolling contact with the respective second portion of each roller;
in which the outer drive or driven ring is a first outer drive or driven ring and the drive system further comprises a second outer drive or driven ring, the first outer drive or driven ring and the second outer drive or driven ring being arranged symmetrically one on each side of the fixed outer ring, and being connected to each other to rotate together.

53. The drive system of claim 52 further comprising gear teeth on one or more pairs of surfaces in rolling contact.

54. The drive system of claim 52 in which the rollers are tapered, with respective tapered portions narrowing inwardly or outwardly.

55. The drive system of claim 54 in which surfaces contacting the respective tapered portions are correspondingly tapered.

56. The drive system of claim 55 in which the surfaces contacting the respective tapered portions are tapered in ratios corresponding to the ratios of the diameters of the respective tapered portions at the contacting surfaces.

57. The drive system of claim 52 in which the rollers have a reflective symmetry with respect to a plane, the rollers defining respective axes perpendicular to the plane.

58. The drive system of claim 57 in which the rollers are planet rollers, the drive system further comprising a sun drive roller arranged in rolling contact with the planet rollers, and in which elements of the sun drive roller in rolling contact with the planet rollers define axes perpendicular to the plane and collectively have a reflective symmetry with respect to the plane.

59. The drive system of claim 52 in which the rollers are hollow.

60. A drive system comprising:
rollers, each roller having a first portion of a first diameter and a second portion of a second diameter, the rollers being planet rollers;
a fixed outer ring arranged in rolling contact with the respective first portion of each roller;
an outer drive or driven ring arranged in rolling contact with the respective second portion of each roller; and
a sun drive roller arranged in rolling contact with the planet rollers;
in which the planet rollers have a reflective symmetry with respect to a plane, the rollers defining respective axes perpendicular to the plane.

61. The drive system of claim 60 further comprising gear teeth on one or more pairs of surfaces in rolling contact.

62. The drive system of claim 60 in which the planet rollers are tapered, with respective tapered portions narrowing inwardly or outwardly.

63. The drive system of claim 62 in which surfaces contacting the respective tapered portions are correspondingly tapered.

64. The drive system of claim 63 in which the surfaces contacting the respective tapered portions are tapered in ratios corresponding to the ratios of the diameters of the respective tapered portions at the contacting surfaces.

65. The drive system of claim 60 in which the planet rollers have a reflective symmetry with respect to a plane, the planet rollers defining respective axes perpendicular to the plane.

66. The drive system of claim 65 in which elements of the sun drive roller in rolling contact with the planet rollers define axes perpendicular to the plane and collectively have a reflective symmetry with respect to the plane.

67. The drive system of claim 60 in which the fixed outer ring is a first fixed outer ring and the drive system further comprises a second fixed outer ring, the first fixed outer ring and the second fixed outer ring being arranged symmetrically one on each side of the outer drive or driven ring.

68. The drive system of claim 67 in which the first fixed outer ring and the second fixed outer ring are connected to each other.

69. The drive system of claim 68 in which the first fixed outer ring and the second fixed outer ring are connected to each other via a connection portion axially traversing an axial through hole of the sun drive roller.

70. The drive system of claim 60 in which the planet rollers are hollow.

* * * * *